United States Patent
Hsieh et al.

(10) Patent No.: US 10,999,594 B2
(45) Date of Patent: May 4, 2021

(54) VIRTUAL SEARCH AREA FOR CURRENT PICTURE REFERENCING (CPR) AND INTRA BLOCK COPY (IBC)

(71) Applicant: QUALCOMM Incorporated, San Diego, CA (US)

(72) Inventors: Cheng-Teh Hsieh, Del Mar, CA (US); Luong Pham Van, San Diego, CA (US); Vadim Seregin, San Diego, CA (US); Wei-Jung Chien, San Diego, CA (US); Yung-Hsuan Chao, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/716,310

(22) Filed: Dec. 16, 2019

(65) Prior Publication Data
US 2020/0204819 A1 Jun. 25, 2020

Related U.S. Application Data

(60) Provisional application No. 62/783,180, filed on Dec. 20, 2018.

(51) Int. Cl.
*H04N 19/513* (2014.01)
*H04N 19/159* (2014.01)
(Continued)

(52) U.S. Cl.
CPC ......... *H04N 19/513* (2014.11); *H04N 19/105* (2014.11); *H04N 19/159* (2014.11); *H04N 19/176* (2014.11); *H04N 19/423* (2014.11)

(58) Field of Classification Search
CPC .. H04N 19/513; H04N 19/159; H04N 19/176; H04N 19/423; H04N 19/105;
(Continued)

(56) References Cited

U.S. PATENT DOCUMENTS

2016/0330474 A1* 11/2016 Liu .................. H04N 19/56

FOREIGN PATENT DOCUMENTS

WO 2017058633 A1 4/2017

OTHER PUBLICATIONS

Chen J., et al., "Algorithm Description for Versatile Video Coding and Test Model 3 (VTM 3)", 12, JVET Meeting, Oct. 3, 2018-Oct. 12, 2018, Macao, (The Joint Video Exploration Team of ISO/IEC JTC1/SC29/WG11 and ITU-T SG.16, JVET-L1002, Dec. 3, 2018 (Dec. 3, 2018), XP030198628, 38 pages, Retrieved from the Internet: URL: http://phenix.int-evry.fr/jvet/doc_end_user/documents/12_Macao/wg11/JVET-L1002-v1.zip JVET-L1002-v1.docx [retrieved on Dec. 3, 2018], paragraph [3.2.5], paragraph [3.9.1].

(Continued)

*Primary Examiner* — Nam D Pham
(74) *Attorney, Agent, or Firm* — Polsinelli LLP

(57) ABSTRACT

Systems and techniques for intra-block copy (IBC) prediction in processing video data include the use of one or more virtual search areas (VSAs) which can be generated to include one or more references to one or more pixels stored in a physical memory. The one or more VSAs can provide references to additional reconstructed sample values that are derived from previously decoded blocks without incurring physical memory use for storage of the additional reconstructed samples. A search area for performing the IBC prediction for a current block of the video data can be extended to include the one or more VSAs. Extending the search area to include the one or more VSAs provides the IBC prediction with additional search area for finding one or more prediction blocks or prediction samples without having to utilize physical memory to store the additional reconstructed samples from previously decoded blocks.

30 Claims, 11 Drawing Sheets

(51) Int. Cl.
    H04N 19/176    (2014.01)
    H04N 19/423    (2014.01)
    H04N 19/105    (2014.01)
(58) Field of Classification Search
    CPC .... H04N 19/563; H04N 19/70; H04N 19/433; H04N 19/593
    See application file for complete search history.

(56) References Cited

OTHER PUBLICATIONS

International Search Report and Written Opinion—PCT/US2019/066948—ISA/EPO—dated Mar. 31, 2020.
Ling N., et al., "Adaptive Intra Prediction Padding to Improve Intra Motion Compensation", 25, Picture Coding Symposium, Apr. 24, 2006-Apr. 26, 2006, Beijing, Apr. 24, 2006 (Apr. 24, 2006), 4 pages, XP030080231, paragraph [0001]-paragraph [0002], figures 1-4.
Sun Y-C., et al., "Improvements of HEVC SCC Palette Mode and Intra Block Copy", IEEE Journal on Emerging and Selected Topics in Circuits and Systems, IEEE, Piscataway, NJ, USA, vol. 6, No. 4, Dec. 1, 2016 (Dec. 1, 2016), pp. 433-445, XP011636922, ISSN: 2156-3357, DOI: 10.1109/JETCAS.2016.2598193, [retrieved on Dec. 12, 2016], the whole document.
Van L.P., et al., "CE8-related: Virtual Search Area for Current Picture Referencing (CPR)", 13. JVET Meeting, Jan. 9, 2018-Jan. 18, 2018, Marrakech; (The Joint Video Exploration Team of ISO/IEC JTC1/SC29/WG11 and ITU-T SG.16), No. JVET-M0151, Jan. 1, 2018 (Jan. 1, 2018), XP030200157, 6 pages, Retrieved from the Internet: URL: http://phenix.int-evry.fr/jvet/doc_end_user/documents/13_Marrakech/wg11/JVET-M0151-v1.zip JVET-M0151_docx [retrieved on Jan. 1, 2018], the whole document.
Van L.P., et al., "CE8-related: Virtual Search Area for Current Picture Referencing (CPR)", 13. JVET Meeting, Jan. 9, 2019-Jan. 18, 2019, Marrakech; (The Joint Video Exploration Team of ISO/IEC JTC1/SC29/WG11 and ITU-T SG.16), No. JVET-M0151, Jan. 9, 2019 (Jan. 9, 2019), XP030201005, 5 pages, Retrieved from the Internet: URL: http://phenix.int-evry.fr/jvet/doc_end_user/documents/13_Marrakech/wg11/JVET-M0151-v2.zip JVET-M0151_Luong.pptx [retrieved on Jan. 9, 2019], the whole document.
Xu X., et al., "Intra Block Copy in HEVC Screen Content Coding Extensions", IEEE Journal on Emerging and Selected Topics in Circuits and Systems, IEEE, Piscataway, NJ, USA, vol. 6, No. 4, Dec. 1, 2016 (Dec. 1, 2016), pp. 409-419, XP011636923, ISSN: 2156-3357, DOI:10.1109/JETCAS.2016.2597645, [retrieved on Dec. 12, 2016], the whole document.

* cited by examiner

400

| VPDU0 | VPDU1 |
|---|---|
| VPDU2 | VPDU3 |

FIG. 4

VIRTUAL SEARCH AREA FOR CURRENT PICTURE REFERENCING (CPR) AND INTRA BLOCK COPY (IBC)

CROSS-REFERENCES TO RELATED APPLICATIONS

This application claims the benefit of U.S. Provisional Application No. 62/783,180, filed on Dec. 20, 2018, which is hereby incorporated by reference, in its entirety and for all purposes.

FIELD

The present disclosure generally relates to video coding and compression, and more specifically to techniques and systems relating to Intra-Block Copy (IBC) or Current Picture Referencing (CPR).

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), MPEG-2 Part 2 coding (MPEG stands for moving picture experts group), VP9, Alliance of Open Media (AOMedia) Video 1 (AV1), Essential Video Coding (EVC), or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

Intra-block copy (IBC) (also referred to as Current Picture Referencing (CPR)) is an intra-prediction technique for predicting a block of a picture of video data from one or more reconstructed pixels of previously decoded blocks of the picture. In some cases, the previously decoded blocks used by IBC can include unfiltered previously decoded blocks (e.g., before in-loop filtering). Using redundancy in an image picture or frame. IBC performs block matching to predict a block of samples as a displacement from a reconstructed block of samples in a neighboring or a non-neighboring region of the picture. By removing the redundancy from repeating patterns of content, the IBC prediction can improve coding efficiency, but can consume additional storage space for storing reconstructed pixels (e.g., unfiltered reconstructed pixels).

One or more systems and methods of coding are described herein for enhancing the search area for IBC prediction. In some cases, the systems and methods described herein can address the storage space utilization for the IBC prediction. In some examples, the number of samples made available for IBC prediction can be increased without incurring additional storage space. In some examples, one or more virtual search areas (VSAs) can be generated to include one or more references to one or more pixels stored in a physical memory. In some cases, the one or more references to the one or more pixels stored in the physical memory can effectively constitute pixel padding without incurring pixel storage space in the physical memory for the padded pixels. The search area for performing the IBC prediction for a current block can be extended to include the virtual search area (e.g., the padding pixels of the virtual search area). For example, the virtual search area can provide a reference to additional reconstructed sample values that are derived from previously decoded blocks without incurring physical memory use for storage of the additional reconstructed samples. In some examples, extending the search area to include the virtual search area provides the IBC prediction being performed for the current block with additional search area (i.e., search area being virtual in that pixel values within the search area are not stored in physical memory) for finding a prediction block or prediction samples without having to utilize physical memory to store the additional reconstructed samples from previously decoded blocks referenced above.

According to at least one example, a method of decoding video data is provided. The method includes obtaining an encoded video bitstream including video data. The method further includes generating a virtual search area for performing intra-block copy prediction for a current block of the video data, the virtual search area including one or more references to one or more pixels stored in a physical memory. The method further includes extending a search area for performing the intra-block copy prediction for the current block to include the virtual search area.

In another example, an apparatus for decoding video data is provided. The apparatus includes a memory and a processor implemented in circuitry. The processor is configured to and can obtain an encoded video bitstream including video data. The processor is further configured to and can generate a virtual search area for performing intra-block copy prediction for a current block of the video data, the virtual search area including one or more references to one or more pixels stored in a physical memory. The processor is further configured to and can extend a search area for performing the intra-block copy prediction for the current block to include the virtual search area.

In another example, a non-transitory computer-readable medium is provided that has stored thereon instructions that, when executed by one or more processors, cause the one or more processors to: obtain an encoded video bitstream including video data; generate a virtual search area for performing intra-block copy prediction for a current block of the video data, the virtual search area including one or more references to one or more pixels stored in a physical memory; and extend a search area for performing the intra-block copy prediction for the current block to include the virtual search area.

In another example, an apparatus for decoding video data is provided. The apparatus includes means for obtaining an encoded video bitstream including video data. The apparatus further includes means for generating a virtual search area for performing intra-block copy prediction for a current block of the video data, the virtual search area including one or more references to one or more pixels stored in a physical memory. The apparatus further includes means for extending a search area for performing the intra-block copy prediction for the current block to include the virtual search area.

According to at least one example, a method of encoding video data is provided. The method includes obtaining a current block of a picture of video data. The method further includes generating a virtual search area for performing intra-block copy prediction for the current block, the virtual search area including one or more references to one or more pixels stored in a physical memory. The method further includes extending a search area for performing the intra-block copy prediction for the current block to include the virtual search area. The method further includes generating an encoded video bitstream including at least a portion of the current block.

In another example, an apparatus for encoding video data is provided. The apparatus includes a memory and a processor implemented in circuitry. The processor is configured to and can obtain a current block of a picture of video data. The processor is further configured to and can generate a virtual search area for performing intra-block copy prediction for a current block of the video data, the virtual search area including one or more references to one or more pixels stored in a physical memory. The processor is further configured to and can extend a search area for performing the intra-block copy prediction for the current block to include the virtual search area.

In another example, a non-transitory computer-readable medium is provided that has stored thereon instructions that, when executed by one or more processors, cause the one or more processors to: obtain an encoded video bitstream including video data; generate a virtual search area for performing intra-block copy prediction for a current block of the video data, the virtual search area including one or more references to one or more pixels stored in a physical memory; extend a search area for performing the intra-block copy prediction for the current block to include the virtual search area; and generate an encoded video bitstream including at least a portion of the current block.

In another example, an apparatus for encoding video data is provided. The apparatus includes means for obtaining a current block of a picture of video data. The apparatus further includes means for generating a virtual search area for performing intra-block copy prediction for a current block of the video data, the virtual search area including one or more references to one or more pixels stored in a physical memory. The apparatus further includes means for extending a search area for performing the intra-block copy prediction for the current block to include the virtual search area. The apparatus further includes means for generating an encoded video bitstream including at least a portion of the current block.

In some aspects of the methods, apparatuses, and computer-readable media described above, the physical memory includes a circular buffer for storing reconstructed pixels of a coding unit comprising one or more blocks of the video data.

In some aspects of the methods, apparatuses, and computer-readable media described above, the one or more pixels stored in the physical memory include reconstructed pixels belonging to a boundary of the coding unit.

In some aspects of the methods, apparatuses, and computer-readable media described above, the one or more references to the one or more pixels stored in the physical memory include repeated references to the reconstructed pixels belonging to the boundary.

In some aspects of the methods, apparatuses, and computer-readable media described above, the repeated references to the reconstructed pixels belonging to the boundary include a first reference to at least one reconstructed pixel belonging to the boundary and a second reference to the at least one reconstructed pixel belonging to the boundary.

In some aspects of the methods, apparatuses, and computer-readable media described above, the current block belongs to the coding unit.

In some aspects of the methods, apparatuses, and computer-readable media described above, the coding unit includes two or more virtual pipeline data units (VPDUs), at least one VPDU of the two or more VPDUs including the current block, and wherein at least a portion of the circular buffer is configured to store reconstructed pixels of the at least one VPDU while intra-block copy prediction is being performed on the one or more blocks of the at least one VPDU.

In some aspects of the methods, apparatuses, and computer-readable media described above, at least the portion of the circular buffer is unavailable for storing pixels of the search area for performing the intra-block copy prediction for the current block.

In some aspects of the methods, apparatuses, and computer-readable media described above, the physical memory comprises a line buffer for storing reconstructed pixels of one or more blocks of the video data.

In some aspects of the methods, apparatuses, and computer-readable media described above, the one or more blocks belong to a neighboring coding unit of a current coding unit comprising the current block.

In some aspects of the methods, apparatuses, and computer-readable media described above, the one or more references to the one or more pixels stored in the physical memory include repeated references to the reconstructed pixels stored in the line buffer.

In some aspects of the methods, apparatuses, and computer-readable media described above, the repeated references to the reconstructed pixels stored in the line buffer comprise a first reference to at least one reconstructed pixel stored in the line buffer and a second reference to the at least one reconstructed pixel stored in the line buffer.

Some aspects of the methods, apparatuses, and computer-readable media described above further include performing the intra-block copy prediction for the current block using one or more references to one or more pixels in the virtual search area.

Some aspects of the methods, apparatuses, and computer-readable media described above further include reconstructing the current block based on a prediction value obtained using the intra-block copy prediction and a residual value.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing:

FIG. 4 is a diagram illustrating an example of a 128×128 coding tree unit (CTU) that is split into 64×64 blocks in pipeline processing, in accordance with some examples;

DETAILED DESCRIPTION

Figure 1:
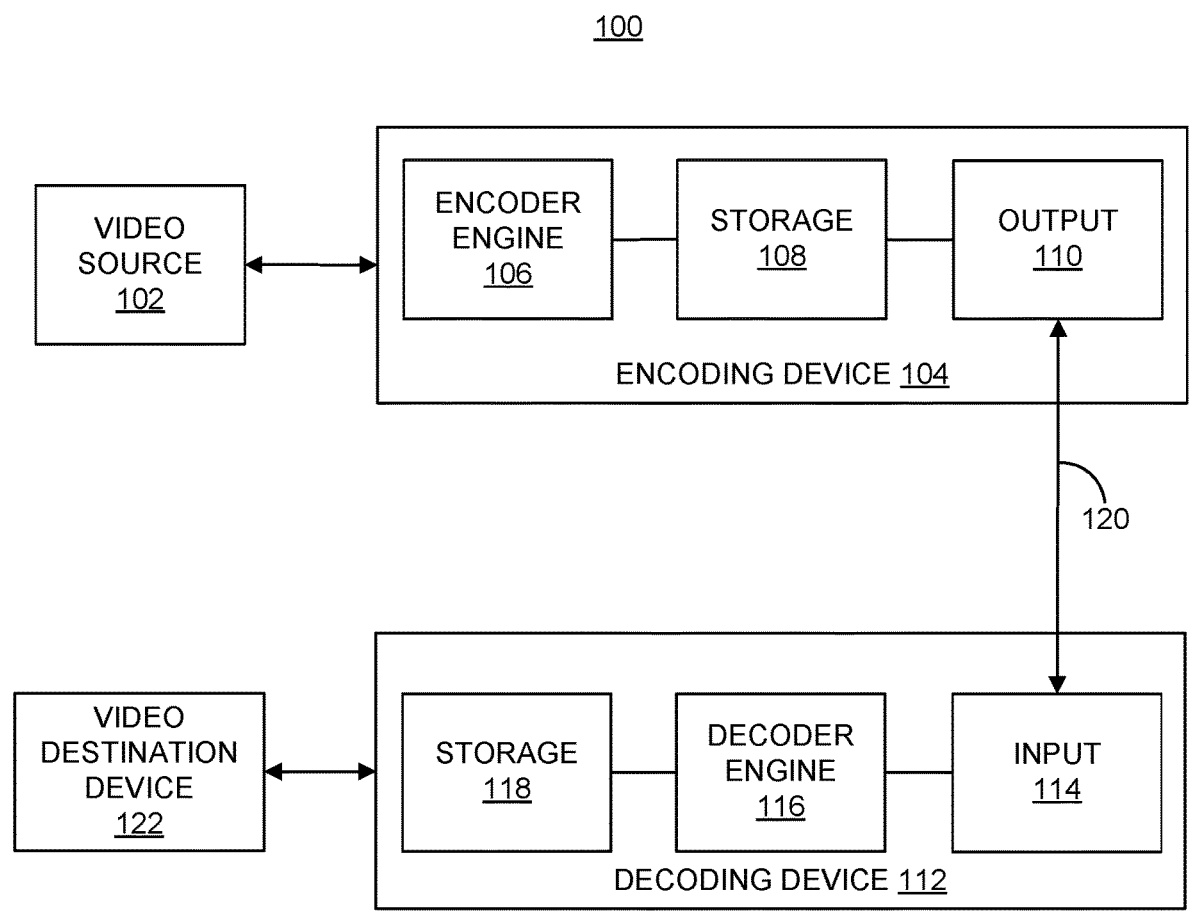
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill. Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

Several systems and methods of video coding using video encoders, decoders, and other coding processing devices are described herein. In some examples, one or more systems and methods of video coding are described for performing Intra-Block Copy (IBC) or Current Picture Referencing (CPR). For example, the one or more systems and methods described herein provide performance improvements and complexity reduction of IBC and CPR. The techniques described herein can be applied to any of the existing video codecs, such as High Efficiency Video Coding (HEVC), Versatile Video Coding (VVC), Advanced Video Coding (AVC), or the like, and/or can be an efficient coding tool in any future video coding standards. In some cases, the systems and methods described herein can be used for screen content coding, including the support of possibly high bit depth (more than 8 bits), different chroma sampling formats (e.g., such as 4:4:4, 4:2:2, 4:2:0, 4:0:0, among others). The systems and methods can also be applied to coding of other video and/or still image content.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H1.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (JVET) to explore new coding tools for the next generation of video coding standard, named Versatile Video Coding (VVC). The reference software is called VVC Test Model (VTM). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others). VP9, Alliance of Open Media (AOMedia) Video 1 (AV1), and Essential Video Coding (EVC) are other video coding standards for which the techniques described herein can be applied.

Many embodiments described herein can be performed using video codecs such as VTM, VVC, HEVC, AVC, and/or extensions thereof. However, the techniques and systems described herein may also be applicable to other coding standards, such as MPEG, JPEG (or other coding standard for still images), VP9, AV1, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. In other instances, a picture may be monochrome and may only include an array of luma samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. There are a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
|---|---|
| 0 | INTRA_PLANAR |
| 1 | INTRA_DC |
| 2 ... 34 | INTRA_ANGULAR2 ... INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, $refIdx_0$ and $\Delta x_1$, $y_1$, $refIdx_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, $refIdx_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible piano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 10. An example of specific details of the decoding device 112 is described below with reference to FIG. 11.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As described above, for each block, a set of motion information (also referred to herein as motion parameters) can be available. A set of motion information contains motion information for forward and backward prediction directions. The forward and backward prediction directions are two prediction directions of a bi-directional prediction mode, in which case the terms "forward" and "backward" do not necessarily have a geometrical meaning. Instead, "forward" and "backward" correspond to reference picture list 0 (RefPicList0 or L0) and reference picture list 1 (RefPicList1 or L1) of a current picture. In some examples, when only one reference picture list is available for a picture or slice, only RefPicList0 is available and the motion information of each block of a slice is always forward.

In some cases, a motion vector together with its reference index is used in coding processes (e.g., motion compensation). Such a motion vector with the associated reference index is denoted as a uni-predictive set of motion information. For each prediction direction, the motion information can contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, it typically does not happen within a coded video sequence. When multiple coded video sequences are present in a bitstream, pictures with a same value of POC may be closer to each other in terms of decoding order. POC values of pictures can be used for reference picture list construction, derivation of reference picture set as in HEVC, and motion vector scaling.

In H.264/AVC, each inter macroblock (MB) may be partitioned in four different ways, including: one 16×16 MB partition; two 16×8 MB partitions; two 8×16 MB partitions; and four 8×8 MB partitions. Different MB partitions in one MB may have different reference index values for each direction (RefPicList0 or RefPicList1). In some cases, when an MB is not partitioned into four 8×8 MB partitions, it can have only one motion vector for each MB partition in each direction. In some cases, when an MB is partitioned into four 8×8 MB partitions, each 8×8 MB partition can be further partitioned into sub-blocks, in which case each sub-block can have a different motion vector in each direction. In some examples, there are four different ways to get sub-blocks from an 8×8 MB partition, including: one 8×8 sub-block; two 8×4 sub-blocks: two 4×8 sub-blocks; and four 4×4 sub-blocks. Each sub-block can have a different motion vector in each direction. Therefore, a motion vector is present in a level equal to higher than sub-block.

In AVC, a temporal direct mode can be enabled at either the MB level or the MB partition level for skip and/or direct mode in B slices. For each MB partition, the motion vectors of the block co-located with the current MB partition in the RefPicList1[0] of the current block are used to derive the motion vectors. Each motion vector in the co-located block is scaled based on POC distances.

A spatial direct mode can also be performed in AVC. For example, in AVC, a direct mode can also predict motion information from the spatial neighbors.

As noted above, in HEVC, the largest coding unit in a slice is called a coding tree block (CTB). A CTB contains a quad-tree, the nodes of which are coding units. The size of a CTB can range from 16×16 to 64×64 in the HEVC main profile. In some cases, 8×8 CTB sizes can be supported. A coding unit (CU) could be the same size of a CTB and as small as 8×8. In some cases, each coding unit is coded with one mode. When a CU is inter-coded, the CU may be further partitioned into 2 or 4 prediction units (PUs), or may become just one PU when further partition does not apply. When two PUs are present in one CU, they can be half size rectangles or two rectangles with ¼ or ¾ size of the CU.

When the CU is inter-coded, one set of motion information is present for each PU. In addition, each PU is coded with a unique inter-prediction mode to derive the set of motion information.

For motion prediction in HEVC, there are two inter-prediction modes, including merge mode and advanced motion vector prediction (AMVP) mode for a prediction unit (PU). Skip is considered as a special case of merge. In either AMVP or merge mode, a motion vector (MV) candidate list is maintained for multiple motion vector predictors. The motion vector(s), as well as reference indices in the merge mode, of the current PU are generated by taking one candidate from the MV candidate list.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information, while an AMVP candidate contains just one motion vector for a specific prediction direction and reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder. In some instances, for single direction inter-prediction of a PU, the encoder can generate a single AMVP candidate list. In some instances, for bi-directional prediction of a PU, the encoder can generate two AMVP candidate lists, one using motion data of spatial and temporal neighboring PUs from the forward prediction direction and one using motion data of spatial and temporal neighboring PUs from the backward prediction direction.

As previously described, various prediction modes may be used in a video coding process, including intra-prediction and inter-prediction. One form of intra-prediction includes intra-block copy (IBC). IBC can also be referred to as Current Picture Referencing (CPR). IBC (or CPR) was proposed during the standardization of the HEVC screen content coding (SCC) extensions. IBC has been proven to be efficient when coding of screen content video materials, and can also be used to code other video content. The IBC/CPR method was proposed in JVET-J0029 and JVET-J0050 to address the need for efficient screen content coding. In the 11$^{th}$ JVET meeting, IBC/CPR mode was adopted into Benchmark Set (BMS) software for further evaluation.

Figure 2:
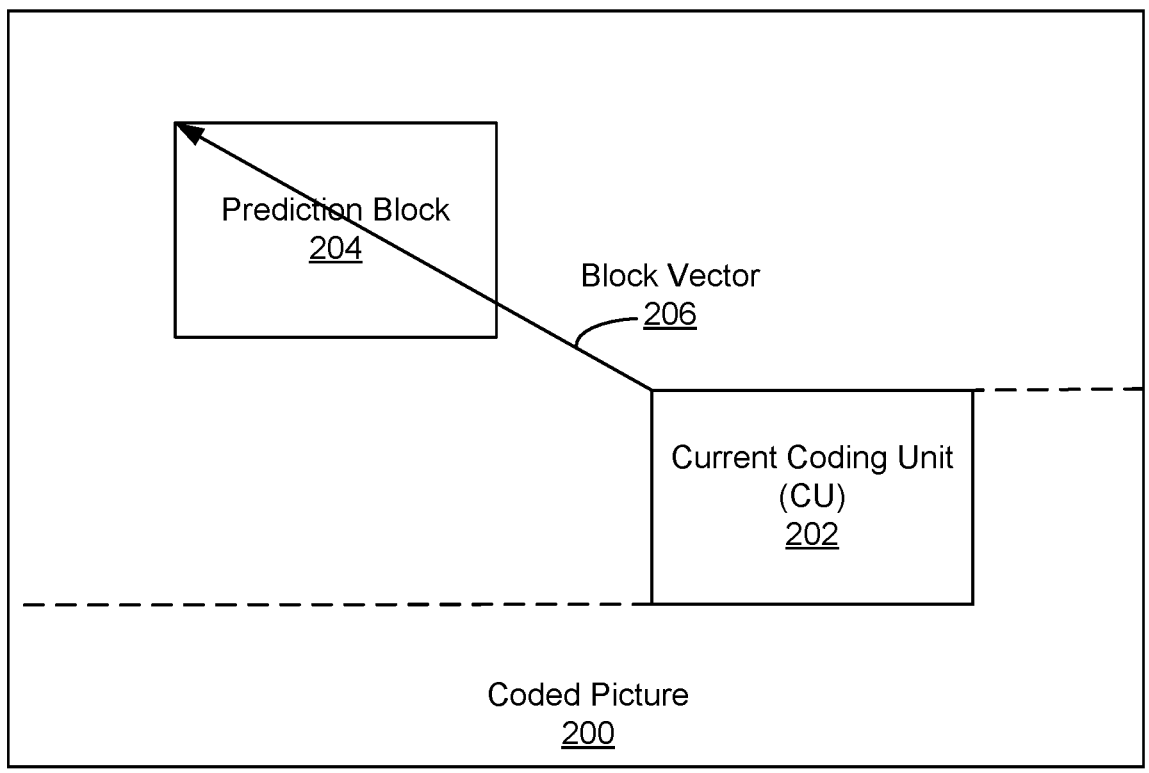
FIG. 2 is a block diagram illustrating an example of a coded picture for which an intra-block copy prediction mode is applied, in accordance with some examples.
Figure 3:
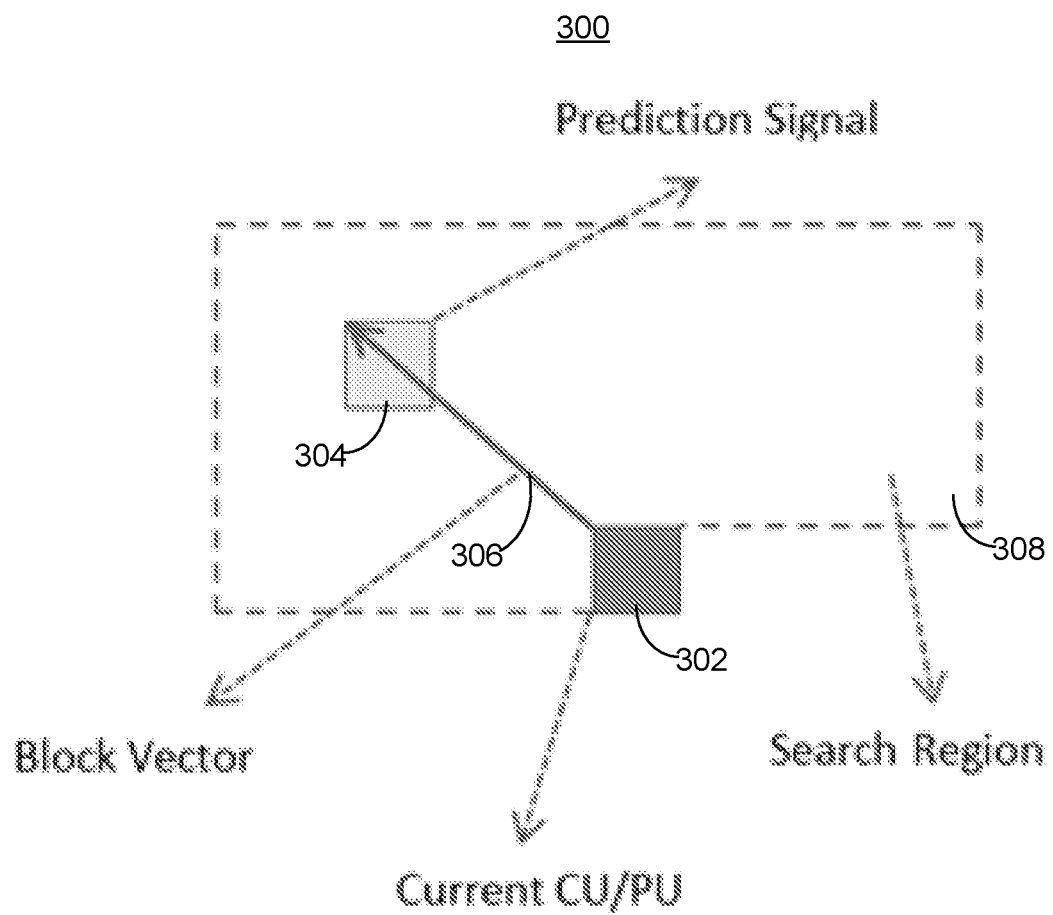
FIG. 3 is a block diagram illustrating another example of intra-block copy prediction mode, in accordance with some examples.

In IBC mode, an intra-block copy block is predicted from one or more already decoded blocks (e.g., before in-loop filtering) of the current picture (see FIG. 2 and FIG. 3). The term in-loop filtering here may include using deblocking (DB) filtering, an Adaptive Loop Filter (ALF), and/or Sample Adaptive Offset (SAO) filtering. Using redundancy in an image picture or frame, IBC performs block matching to predict a block of samples (e.g., a CU, a PU, or other coding block) as a displacement from a reconstructed block of samples in a neighboring or a non-neighboring region of the picture. By removing the redundancy from repeating patterns of content, the intra-block copy prediction improves coding efficiency.

In some implementations of IBC, block compensation can be performed. For example, in some cases, for the luma blocks that are coded with IBC/CPR, prediction of the luma blocks can include block compensation. For instance, integer block compensation can be applied to the predicted luma blocks, in which case interpolation is not needed. In some examples, block compensation can also be performed for chroma blocks. In some implementations, block compensation for chroma blocks can include sub-pel block compensation which would also involve interpolation.

In various examples, IBC prediction (e.g., by an encoding device and/or a decoding device when in an IBC mode) can enable spatial prediction from non-neighboring samples of a block where the non-neighboring samples are located within a current picture. For example, FIG. 2 illustrates a coded picture 200 in which IBC prediction is used to predict a current coding unit 202. The coding unit 202 can include a CTU or a partition of a CTU (e.g., a coding unit (CU) containing luma and chroma sample arrays referred to as coding blocks, a coding block, a prediction unit (PU) containing a luma prediction block (PB) and one or more chroma PBs, a prediction block, or other partition including a block of pixels). The current coding unit 202 is predicted from an already decoded prediction block 204 (e.g., in some cases, before in-loop filtering) of the coded picture 200 using the block vector 206. In-loop filtering may be performed using one or more of an in-loop de-blocking filter, an ALF, and/or an SAO filter. In some cases, in the decoding loop (of an encoder and/or decoder), the predicted values can be added to the residues without any interpolation. For example, the block vector 206 may be signaled as an integer value. After block vector prediction, the block vector difference is encoded using a motion vector difference coding method, such as that specified in the HEVC standard. In some cases, IBC is enabled at both CU and PU level. In some instances, for PU level IBC, 2N×N and N×2N PU partition is supported for all the CU sizes. In some cases, when the CU is the smallest CU, N×N PU partition is supported. In some examples, intra-block copy can be performed for a coding unit using only prediction blocks from a same slice.

FIG. 3 is a block diagram which provides another illustration of the IBC mode. In FIG. 3, a picture 300 is shown, where one or more blocks of the picture 300 can be coded using IBC prediction or other prediction. In some examples, the one or more blocks of the picture 300 can be coded in an order, such as row by row starting from a top left corner and proceeding towards the bottom right corner of the picture 300. In such examples, the picture 300 can have one or more previously coded blocks to the left and/or top of a current block to be coded. For example, considering a current block 302 which is to be coded, the picture 300 can include previously coded blocks in a region of the picture 300 which includes blocks to the left of the current block 302 and/or blocks above the current block 302. This region which includes the previously coded blocks can form a search region 308 for the current block 302 for performing IBC prediction of the current block 302.

For example, the current block 302 can include a current CU (or PU) to be coded using IBC prediction. In some examples, a previously or already decoded prediction block 304 can be found for IBC prediction of the current block 302 by searching for the prediction block 304 in the search region 308. If such a prediction block 304 is found, then a block vector 306 can be generated to identify a location of the prediction block 304 relative to the location of the current block 302 in the picture 300. For example, the block vector 306 can be encoded using a motion vector difference coding such as that specified in the HEVC standard. In some examples, a prediction signal for IBC prediction of the current block 302 can be generated using the prediction block 304 and the block vector 306. In some examples, a larger area of the search region 308 can improve the chances of locating a prediction block such as the prediction block 304 for IBC prediction of the current block 302. In some examples, the reconstructed pixels of the previously decoded blocks in the search region 308 are stored in a physical memory. In some examples, searching for the prediction block 304 for IBC prediction of the current block can include searching the physical memory to locate the previously decoded the prediction block 304. In some examples, the physical memory can include a circular buffer, a line buffer, or other storage space which may be available for encoding or decoding the picture 300.

In some IBC implementations, a pipelined approach can be used where each CTU being coded can be divided into multiple units and processed in a stepwise manner. In some examples, the pipelined approach can enable reuse of resources. For example, physical memory such as the same circular buffer and/or other computational resources can be used for temporary storage of coding information related to one or more of the multiple units being processed. For example, a portion of the storage space in the circular buffer can be freed up after processing one unit to make room for processing another unit. In some examples, the multiple units processed in the pipelined approach can include virtual pipeline data units (VPDUs).

In some examples, VPDUs can include non-overlapping cells in a picture or video frame. For example, VPDUs can be non-overlapping M×M-luma (L)/N×N-chroma (C) units in a picture. The VPDU construct includes virtual blocks that are used for memory access (e.g., to determine which area of memory is used for processing a particular block or blocks of data), defining the size of the memory allocated to implement a Standard-based coding process (e.g., HEVC, VVC, or other coding process). In some examples of a hardware decoding process, consecutive VPDUs can be processed in parallel by multiple processing/decoding pipeline stages. For example, different decoding pipeline stages can process different VPDUs simultaneously. In some cases, a VPDU size can be roughly proportional to the buffer size in some pipelines. For instance, a VPDU size can be set to the size of a transform block (TB) size. In one illustrative example, the size of a VPDU can be 64×64 samples (e.g., luma samples). In HEVC, the VPDU size is set to maximum transform block size which is 32×32-L (Luma samples) and 16×16-C (Chroma samples). In VVC, the VPDU size is set to 128×128-L (Luma samples) and 64×64-C (Chroma samples), which results in the request of larger VPDU sizes.

A VPDU can include one or more blocks (e.g., a CU, PU, TU, or other block). For example, in some cases, a single CU can be included in one VPDU (e.g., the size of the CU and the VPDU size are the same). In some cases, multiple CUs can be included in one VPDU (e.g., the multiple CUs have sizes that are smaller than the VPDU size). Depending on the size of a block (e.g., a CU, PU, or other block), the block may or may not span multiple VPDUs (in which case a block may include multiple VPDUs). For example, a block having a size of 128×64 (128 samples wide×64 samples high) can span two VPDUs that each have a size of 64×64. In another example, a block having a size of 128×128 (128 samples wide×128 samples high) can span four VPDUs that each have a size of 64×64. The block can be split into a certain number of sub-blocks for performing inter-prediction by each of the VPDU pipeline stages. For example, a 128×128 block can be split into for 64×64 sub-blocks for processing by four different VPDU pipeline stages. The block can be split for inter-prediction because there is no dependency on neighboring blocks for performing inter-prediction.

Figure 4:
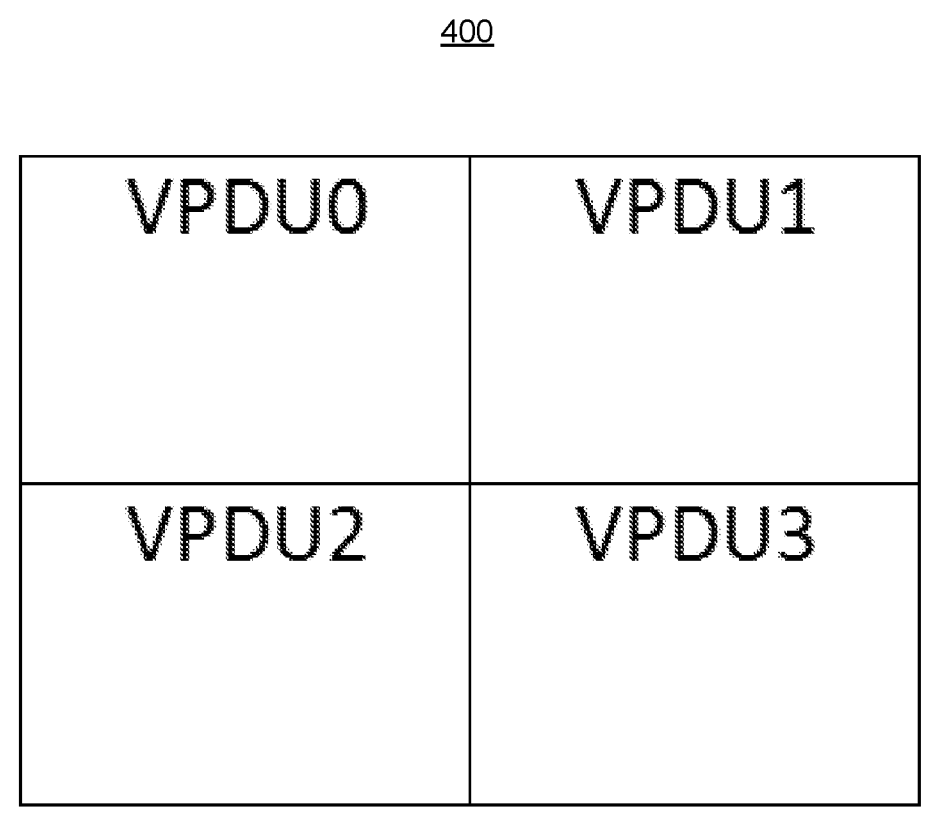

FIG. 4 is a diagram illustrating an example of coding unit 400 which can include one or more blocks of a picture of video data. The coding unit 400 can be divided into two or VPDUs to be processed in a pipelined manner. For example, the coding unit 400 can include a 128×128 CTU (128 samples by 128 samples), which can be divided or split into four 64×64 VPDUs: VPDU0, VPDU1, VPDU2, and VPDU3. In some examples, a circular buffer can provide storage space for processing video data contained in the coding unit 400. For example, a portion of the circular buffer can be used for temporarily storing motion information related to one or more blocks of one of the VPDUs (e.g., VPDU0) for a period of time (e.g., for a pipeline stage duration). For a subsequent period of time (e.g., a subsequent pipeline stage), the portion of the circular buffer can be made available for temporarily storing motion information related to one or more blocks of another one of the VPDUs (e.g., VPDU1). In this manner, the same portion of the circular buffer can be utilized for a pipelined processing of the two or more VPDUs, such as VPDU0-VPDU3 of the coding unit 400 (and/or for VPDUs of other coding units). In some examples, the circular buffer can be implemented as a first-in-first-out (FIFO) buffer.

Accordingly, in various examples, a limited amount of storage space may be available for storing information related to processing video data. The storage space restrictions can lead to problems in implementing IBC, among other inter-prediction and/or intra-prediction techniques. For example, as previously explained, IBC allows spatial prediction from non-neighboring samples which can include previously decoded blocks before in-loop filtering is applied. The previously decoded blocks are located within the same picture and can be signaled by a block vector. For example, reconstructed pixels (before filtering in some cases) of previously decoded prediction blocks within a search region can be stored and used for performing a search of the search region in IBC prediction of a current block. Storing unfiltered reconstructed pixels consumes more storage space, memory bandwidth, and processing resource utilization in comparison to storing filtered reconstructed pixels.

Furthermore, accessing such non-neighboring samples from memory can increase the memory bandwidth consumption and memory access times. For example, in the case of conventional intra-prediction mode, neighboring samples located one row above or one column to the left of a current block can be used in the prediction of the current block. Thus, these neighboring samples may be stored in a local memory or cache based on their likelihood of being accessed in the near future for prediction of the current block. However, since IBC can search for previously decoded blocks which can include non-neighboring samples, such non-neighboring samples may not be located in the cache or local memory at the time that they may be accessed for IBC prediction of the current block. Rather, the non-neighboring samples may be stored in longer term memory locations which may be further away from the local memory. Thus, fetching the non-neighboring samples can involve increased read access times for fetching the non-neighboring samples from non-local memory or cache. In addition to the increased storage space for storing the non-neighboring samples, the duration of time for which the non-neighboring samples are to be stored can also be high. For example, the non-neighboring samples may be accessed for IBC prediction of a current block after a significant amount of time has lapsed since the time the non-neighboring samples were generated. Accordingly, in order to support the increased number of non-neighboring samples to be made available for searching with smaller access times, the IBC mode may place demands on additional fast-access storage space, such as larger local memory structures or caches.

Furthermore, when performing IBC, increased write access is caused due, in part, to the storage of both unfiltered samples (e.g., a prediction block) for IBC-based spatial prediction and filtered reconstructed samples for temporal prediction for future pictures (e.g., using inter-prediction). Thus, there may also be a further increase in the demand for storage space for storing the unfiltered samples as well as the filtered samples that are generated during in-loop filtering.

Some approaches for addressing the increased demands on storage space for IBC include placing restrictions on the search area for locating the prediction block to be used for IBC prediction of a current block. For example, referring to FIG. 3, the search region 308 for locating the current block 304 for IBC prediction of the current block 302 can be restricted. For example, the search region 308 can be limited to include a search region corresponding to storage space that would be equal to the storage space for storing samples of one CTU (referred to as "CTU storage"). For example, the total storage made available for IBC prediction of the current block 302 can be limited to one CTU storage space, placing a corresponding limitation on the search region 308. However, restricting the search region 308 to be limited by one CTU storage space can impact performance of IBC coding. For example, the performance of IBC coding is seen to improve when a larger search area is made available for locating the prediction block 304. In some examples, one CTU storage can include reconstructed pixels within a current CTU that includes the current block 302. In some examples, one CTU storage can include reconstructed pixels from both a left neighboring CTU and the current CTU (e.g., a portion of the pixels from the left neighboring CTU and a portion of the pixels from the current CTU).

In some examples where a circular buffer may be used for pipelined processing, the one CTU storage restriction can be implemented by reusing a portion of the circular buffer for storing newly reconstructed pixels for the current CTU, where that portion was previously utilized for storing reconstructed pixels of a previous CTU. In some examples of implementing the circular buffer, the portion can be updated in a unit by unit manner, with an update rate for a unit being based on a corresponding pipeline stage's throughput. For example, the update rate can be one pixel, four pixels, 2×2 pixels, 4×4 pixels, the whole virtual pipeline data unit (VPDU), or other number of pixels.

One or more systems and methods of coding are described herein that provide performance improvements and complexity reduction to the IBC/CPR mode. For example, techniques described herein address the problems associated with storage space utilized for the IBC prediction. In some examples, the problems associated with storage space restrictions can be overcome using a virtual search area (VSA). In some examples, the virtual search area can include one or more references to one or more pixels stored in a physical memory. For example, the virtual search area can provide a reference to additional reconstructed sample values that are derived from previously decoded blocks without incurring physical memory use for storage of the additional reconstructed samples.

In some examples, the virtual search area can include one or more references to one or more pixels stored in the physical memory, where the one or more references can effectively constitute pixel padding without incurring pixel storage space in the physical memory for the padded pixels. The search area for performing the IBC prediction for a current block can be extended to include the virtual search area (e.g., the padding pixels of the virtual search area). For example, the virtual search area can provide additional reconstructed samples from previously decoded blocks without incurring physical memory use for the additional reconstructed samples. In some examples, extending the search area to include the virtual search area provides the IBC prediction being performed for the current block with additional search area (i.e., search area being virtual in that pixel values within the search area are not stored in physical memory) for finding a prediction block or prediction samples without having to utilize physical memory to store the additional reconstructed samples from previously decoded blocks referenced above.

Figure 5:
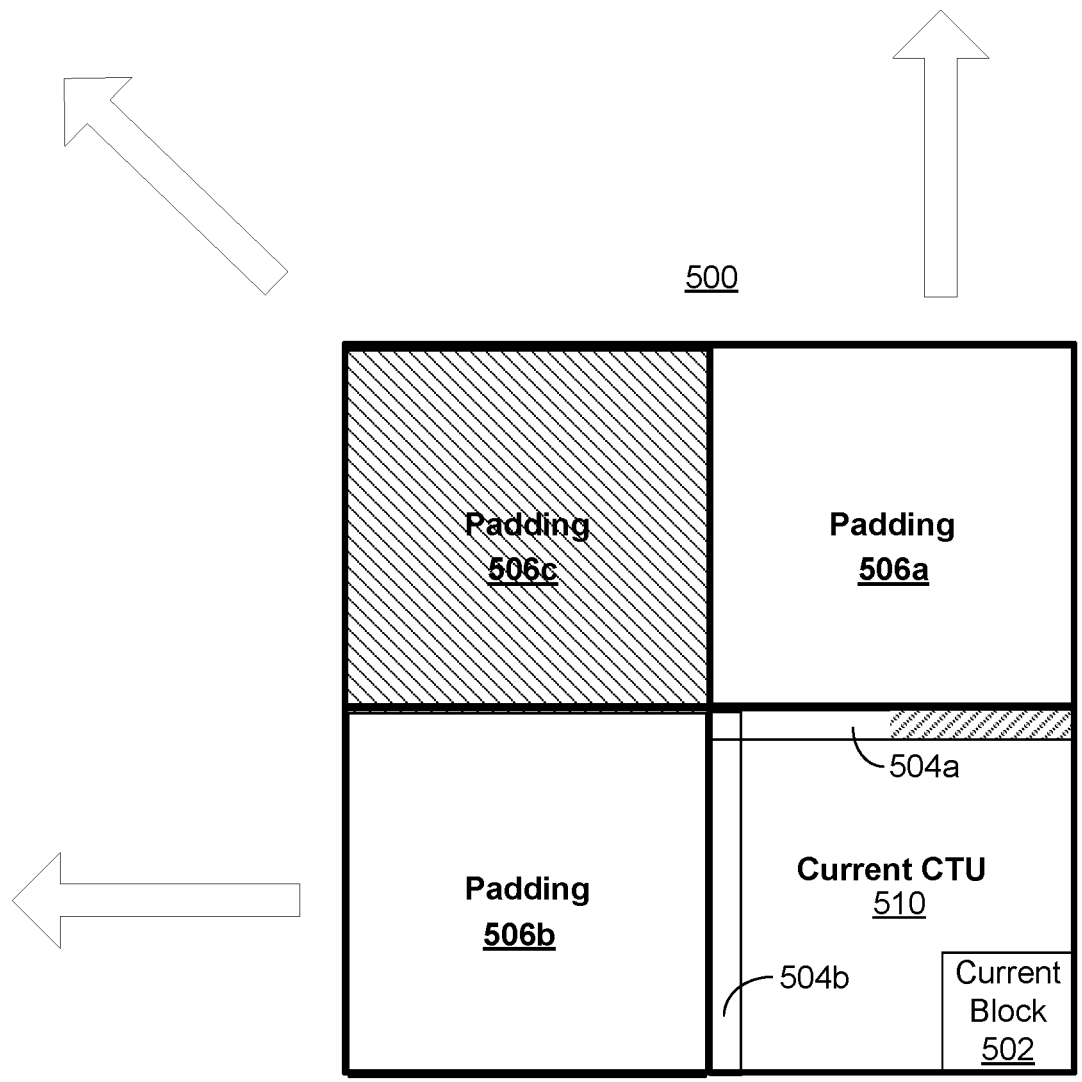
FIG. 5 is a diagram illustrating an example of a current CTU's virtual search area, in accordance with some examples.

FIG. 5 is a block diagram illustrating virtual search areas for a CTU in accordance with some examples. A picture 500 of video data can include one or more coding blocks, such as a coding block identified as a current CTU 510. In some examples, the coding block identified by the reference numeral 510 can include other block sizes or data units, such as a VPDU. In an example, a current block 502 of the current CTU 510 can include a CU/PU to be coded using IBC prediction. According to conventional techniques discussed above, the search area for locating a previously decoded prediction block for the IBC prediction of the current block 502 can be restricted to one CTU storage based on storage space constraints. However, to avoid the negative effects of such restrictions, the search area can be extended beyond the one CTU storage using example techniques disclosed herein.

In some examples, the search area for the IBC prediction of the current block 502 can be extended beyond the current CTU 510 to include one or more virtual search areas 506a, 506b, 506c, and/or other virtual search areas. In some examples, the one or more virtual search areas can include references to reconstructed pixels of one or more previously decoded blocks. For example, the references can include mappings, indices, and/or pointers to storage locations where the reconstructed pixels of one or more previously decoded blocks are stored. In some examples, the one or more virtual search areas can include a predefined fixed pattern, such as a row and/or column of pixels of value "0" or "1" or other pattern. In some examples, the references can include any other indications to storage locations without including the values stored in the storage locations. In some cases, the one or more virtual search areas are said to include a padding, where the padding, as used herein, provides a pixel value which can be searched without consuming storing space for the pixel values.

In some examples, the virtual search area 506a can be formed by using references to previously reconstructed pixels belonging to a boundary 504a (e.g., top boundary) of the current CTU 510. For example, the virtual search area 506a can include padding values that are references to reconstructed pixels of previously decoded blocks belonging to the boundary 504a. In some examples, the reconstructed pixels belonging to the boundary 504a may be stored in a physical memory such as a line buffer, a circular buffer, a ping pong buffer, or other memory structure. The padding values can point to locations in the physical memory where these previously reconstructed pixels of the previously decoded blocks are stored. In some examples, two or more padding values can point to the same decoded block such that the same pixel value can be repeated multiple times within a virtual search area, without increasing the amount of storage in the physical memory. In some examples, a multiple can be assigned to a stored pixel in the physical memory. Using the multiple assigned to the stored pixel, a search algorithm for the IBC can be configured to consider the stored pixel multiple times in finding a prediction block for the current block 502. For example, multiple references to a row of reconstructed pixels belonging to the boundary 504a can effectively generate the virtual search area 506a with the row of reconstructed pixels being repeated multiple times in the virtual search area 506a. Thus, the row of reconstructed pixels can be made available for searching multiple times, potentially improving the likelihood of a prediction block belonging to the row of pixels in the boundary 504a being found in the virtual search area 506a.

The virtual search area 506b can be similarly formed using references to previously reconstructed pixels belonging to a boundary 504b (e.g., left boundary) of the current CTU 510. For example, the virtual search area 506b can be padded with multiple references to reconstructed pixels belonging to the boundary 504b. The reconstructed pixels belonging to the boundary 504b may similarly be stored in a physical memory such as a line buffer or a circular buffer. The padding with multiple references to the reconstructed pixels belonging to the boundary 504b can effectively make the reconstructed pixels belonging to the boundary 504b available for searching multiple times, thus potentially increasing the likelihood of a prediction block being found in the virtual search area 506b.

The virtual search area 506c can be formed using references to previously reconstructed pixels belonging to the boundary 504a, the boundary 504b, or any other previously reconstructed pixels. Similar to the virtual search areas 506a and 506b, the virtual search area 506c$_{[TH1]}$ can include padding with multiple references to reconstructed pixels belonging a boundary or other reconstructed pixels of previously decoded blocks of the current CTU 510. In some examples, the virtual search area 506c can also include a predefined fixed pattern. For example, the predefined fixed pattern can include a pattern formed using the bits "0" and/or "1". In some examples of using a predefined fixed pattern, an encoding device as well as a decoding device can generate the virtual search area 506c using the same predefined fixed pattern. Accordingly, in some examples, the virtual search area 506c can be generated using padding values which may not be derived from reconstructed pixels of previously decoded blocks. In various examples, the padding values in the virtual search area 506c can potentially increase the likelihood of a prediction block being found in the virtual search area 506c.

In some cases, the virtual search areas 506a-506c can each include a search area which is comparable in size to the size of current CTU 510 (e.g., in terms of the number of pixels referenced by the virtual search areas 506a-c). In some cases, the virtual search areas 506a-506c or other such padding can be extended indefinitely (e.g., to infinity), if no other constraint is applied. In some examples, the one or more virtual search areas 506a-506c can be generated using the references to the reconstructed pixels. For example, an encoding device configured to implement IBC prediction, such as the encoding device 104 of FIG. 10, can generate the one or more virtual search areas 506a-506c. The encoding device can encode the references to the reconstructed pixels used in generating the one or more virtual search areas 506a-506c. The encoding (or coding) can include a reconstructed pixel being assigned to one or more padding values, or one or more references to the reconstructed pixel being generated. The one or more references can include pointers or mappings to a storage location where the reconstructed pixel has been previously stored, without incurring additional storage space for the reconstructed pixel. In some examples, if a virtual search area includes multiple references to the same reconstructed pixel, the multiple references can be efficiently coded to include the multiple in the coding. In some examples, the one or more virtual search areas can be signaled (e.g., to a decoding device such as the decoding device 112 of FIG. 11), where the signaling can include the references and the multiple which indicates the number of times the reconstructed pixels are to be repeated.

In some examples, it is possible for a prediction block to be partially located outside a search area, where a portion of the prediction block is located within the search area and another portion of the prediction block is located outside the search area. For example, a prediction block which includes a CU/PU may not belong entirely within the current CTU 510, with a portion of the prediction block being located inside of the current CTU 510a and a portion of the prediction block being located outside the current CTU 510. In some implementations, a search for prediction blocks within the current CTU 510 can be constrained to include searching only the prediction blocks which are entirely within the current CTU 510. For example, the search could be limited to a storage space which includes reconstructed pixels of previously decoded blocks which are entirely within the current CTU 510. In such examples, the prediction block which is partially located outside the current CTU 510 may be excluded from the search. In example implementations, one or more virtual search areas can include references to such prediction blocks even if they are partially located outside the current CTU 510. For instance, one or more padding pixels can be used to virtually represent the pixels from the prediction block that are outside of the current CTU 510, allowing the prediction block to be included in the search and potentially used for IBC. For example, one or more padding values of one or more virtual search areas 506a-506c can include a reference to a storage location where the prediction block is stored, even if the storage location is not entirely within a storage space allocated for the current CTU 510. In this way, the one or more virtual search areas 506a-506c can allow a search for prediction blocks which may not be entirely located within the current CTU 510.

Figure 6:
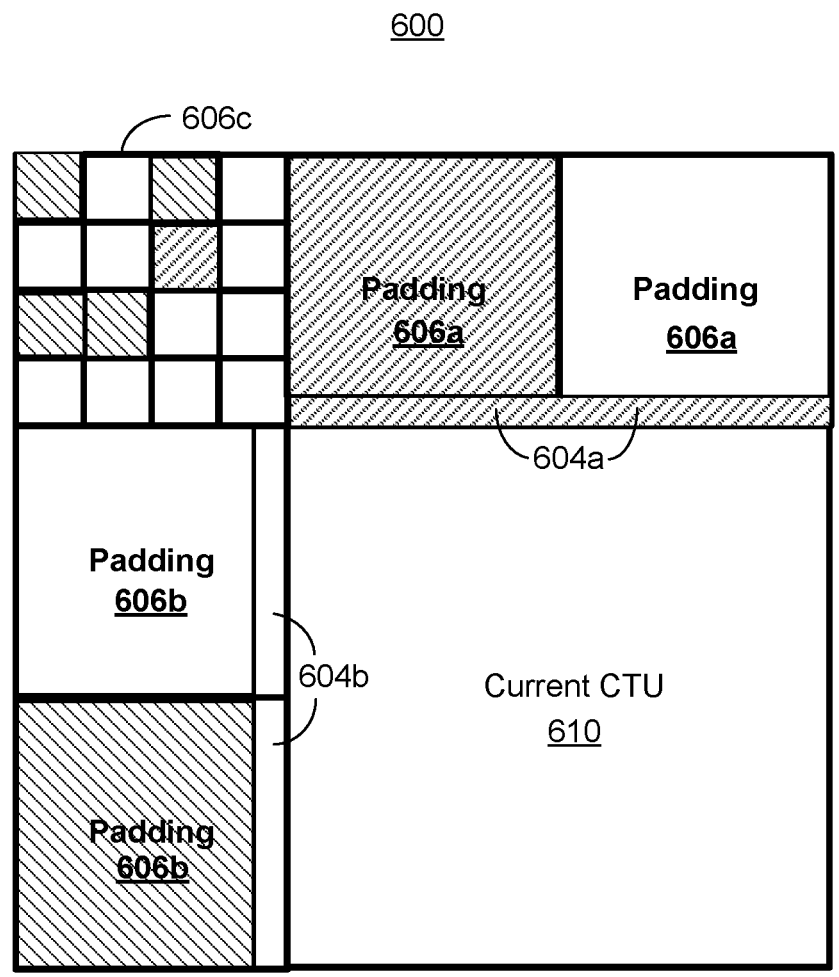
FIG. 6 is a diagram illustrating an example of a virtual search area with a makeup area, in accordance with some examples.

FIG. 6 is a block diagram illustrating virtual search areas and make up areas for a CTU in accordance with some examples. A picture 600 of video data can include one or more coding blocks such as a current CTU 610. The search area for coding blocks of the current CTU 610 using IBC can be extended beyond the current CTU 610 using one or more virtual search areas 606a, 606b, 606c, and/or other search areas. In some examples, the reconstructed pixels of neighboring CTUs of the current CT 610 can be used for constructing the one or more virtual search areas 606a, 606b, 606c. For example, previously reconstructed pixels belonging to a boundary 604a of a top neighboring CTU can be stored in a physical memory such as a line buffer. The virtual search area 606a can include one or more references to the storage locations (e.g., in the line buffer) of the previously reconstructed pixels of the boundary 604a. Similarly, previously reconstructed pixels belonging to a boundary 604b of a left neighboring CTU can be stored in a physical memory such as the same or a different line buffer than the one in which the reconstructed pixels of the boundary 604a are stored. The virtual search area 606b can include one or more references to the storage locations of the previously reconstructed pixels belonging to the boundary 604b.

In addition to or as an alternative to the one or more references to the previously reconstructed pixels of neighboring CTUs, the virtual search areas 606a and 606b can also include references to previously reconstructed pixels belonging to boundaries of the current CTU 610 (e.g., top boundary and/or left boundary of the current CTU 610).

The virtual search area 606c can be formed using references to previously reconstructed pixels belonging to the boundary 604a of the left neighboring CTU, the boundary 604b of the top neighboring CTU, a top boundary of the current CTU 610, a left boundary of the current CTU 610, a combination of one or more of the above reconstructed pixels, or any other "made up" value, including values obtained from previously reconstructed pixels of the current CTU 610. In this disclosure, a "made up" value can refer to a pixel value that has been used for padding in the extending the search area, where the pixels or values referred to by the made up values do not consume additional storage space. In some examples, the made up values can refer to constant values or other references. In some examples, the made up values included in the virtual search area 606c can increase the likelihood of a prediction block for IBC of a block of the current CTU 610 being found in the virtual search area 606c.

Figure 7A:
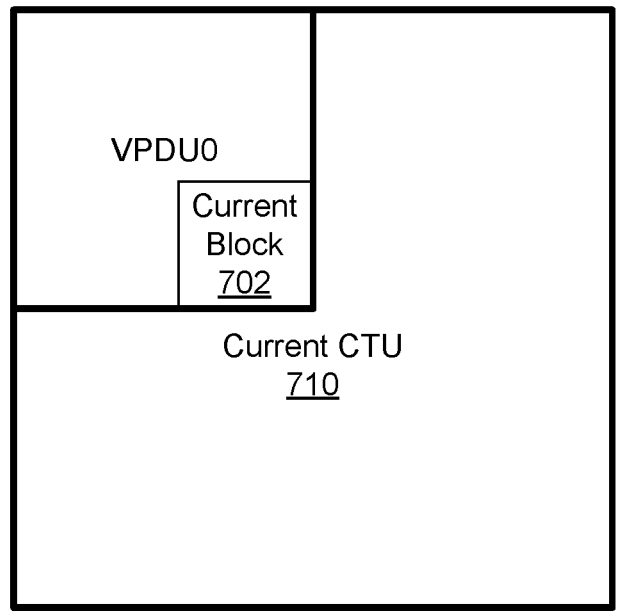
FIG. 7A is a diagram illustrating an example of a virtual search area for a shared storage case, in accordance with some examples.
Figure 7B:
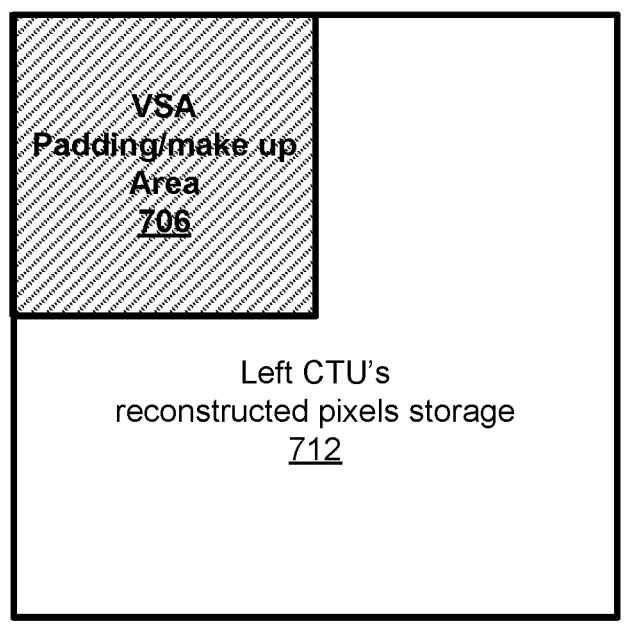
FIG. 7B is a diagram illustrating another example of a virtual search area for a shared storage case, in accordance with some examples.

FIG. 7A and FIG. 7B are block diagrams which illustrate the use of virtual search areas and circular buffers for IBC prediction. For example, FIG. 7A illustrates a current CTU 710 of a picture 700 of video data, where the current CTU 710 can include one or more blocks configured to be predicted using IBC prediction. The current CTU 710 can be divided into two or more virtual pipeline data units (VPDUs) for processing in a pipelined manner using shared resources such as a circular buffer. In an illustrative example, one of the two or more VPDUs of the current CTU 710 can include VPDU0 whose blocks may be in a current pipeline stage of processing for IBC prediction. For example, a portion of the circular buffer may be temporarily reserved and used for processing and updating blocks of VPDU0 during the current pipeline stage. In an example, a current block 702 of the VPDU0 can include a CU or a PU to be coded using IBC prediction. For example, IBC prediction of the current block 702 can include searching for a prediction block among previously decoded blocks of VPDU0 (among other previously decoded blocks, such as those in virtual search areas as previously explained). In some examples, the reconstructed pixels of one or more blocks of VPDU0 may be stored in the circular buffer while IBC prediction is being performed on one or more blocks of the VPDU0. For example, the reconstructed pixels of the previously decoded blocks of VPDU0 can be stored in the portion of the circular buffer during the current pipeline stage when IBC prediction of the current block 702 is being performed.

However, searching through the stored reconstructed pixels of one or more previously decoded blocks of VPDU0 (at the same time that one or more other blocks of VPDU0 are being processed introduces complexities. For example, searching through previously decoded blocks of VPDU0 in the portion of the circular buffer for IBC prediction of the current block 702 is difficult because the searching can involve reading the stored being performed in parallel with other operations. For example, the other operations can include contents (e.g., reconstructed pixels of other blocks) being written to the portion of the circular buffer. Supporting multiple simultaneous reads and writes to the same or overlapping regions of physical memory can involve complex and expensive hardware designs among other challenges. Therefore, it is desirable to avoid searching through the portion of the circular buffer reserved for processing a VPDU at the same time that one or more blocks of the VPDU are being processed. For example, it is desirable to disallow or prevent searching through the portion of the circular buffer reserved for VPDU0 when IBC prediction is being performed on one or more blocks such as the current block 702 of the VPDU0.

In some examples, a virtual search area may be provided to overcome the restriction of the previously decoded blocks of VPDU0 being unavailable for searching while VPDU0 is being processed (e.g., for IBC prediction of the current block 702). For example, FIG. 7B is a block diagram illustrating a circular buffer 720. In some examples, the circular buffer 720 can be used for storing information for two or more VPDUs at the same time. For example, the circular buffer 720 can store reconstructed pixels of VPDU0 in a portion 706 while VPDU0 is being processed. Another portion 712 of the circular buffer 720 can be used for storing information for one or more other VPDUs, such as reconstructed pixels of one or more VPDUs belonging to a neighboring CTU to the left of the current CTU 710 (e.g., an immediately-adjacent CTU to the left of the current CTU 710). In some examples, since the portion 706 reserved for the VPDU0 of the current CTU 710 may be unavailable for searching during IBC prediction of one or more blocks of VPDU0, a virtual search area can be provided for IBC prediction of the one or more blocks of VPDU0. In some examples, the virtual search area can include references to one or more reconstructed pixel values of previously decoded blocks of other VPDUs (e.g., of the current CTU 710 or other CTU) or made up pixel values.

In some examples, a virtual search area can be used if the available search area for one or more blocks of a coding unit are constrained in another manner. For example, if the search area available for a CTU is constrained to include previously decoded pixels of an area smaller than the CTU, then one or more virtual search areas can be used to extend the available search area. For example, if the search area for a 128×128 CTU is constrained to include a search area corresponding to that of a 64×64 VPDU, then one or more virtual search areas such as those described above can be used to extend the search area beyond the 64×64 VPDU search area.

In the various examples discussed herein, the one or more virtual search areas for IBC/CPR can lead to improvements in coding performance without increasing the storage cost. In some examples, the one or more virtual search areas for IBC/CPR can enable a regular shape (e.g., a rectangular shape) for the search area, even if an available search area is an irregular shape. A regular shaped search area can enable maintaining continuous motion estimation without breaks which can be introduced due to irregular shaped search areas.

Figure 8:
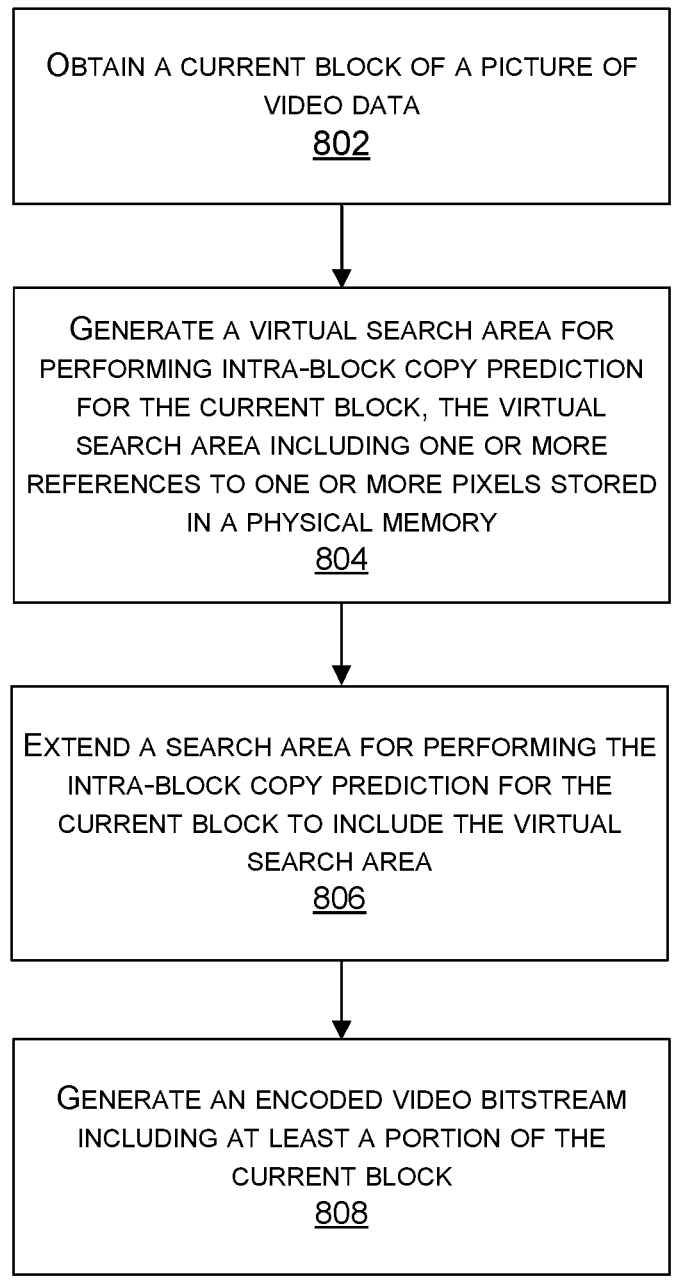
FIG. 8 is a flowchart illustrating an example of a process of encoding video data including performing intra-block copy prediction using a virtual search area, in accordance with some examples.

FIG. 8 is a flowchart illustrating an example of a process 800 of encoding video data by extending a search area for performing intra-block copy (IBC) prediction of a block of video data, using one or more virtual search areas. At block 802, the process 800) includes obtaining a current block of a picture of video data. In some examples, the video data can include un-encoded video data, such as when the process 800 is performed by an encoding device. The video data can include a plurality of pictures, and the pictures can be divided into a plurality of blocks, as previously described. The process 800 can determine motion information for the pictures and/or blocks, which can be used to perform motion compensation.

At 804, the process 800 includes generating a virtual search area for performing intra-block copy prediction for a current block of the video data, the virtual search area including one or more references to one or more pixels stored in a physical memory. For example, as shown in FIG. 5, one or more virtual search areas 506a-c can be generated for performing intra-block copy prediction for the current block 502 of the video data. The current block 502 can include a CU or PU and can belong to a current CTU 510. In some examples, the virtual search areas 506a-c can include one or more references to one or more pixels stored in a physical memory.

In some examples, the physical memory can include a circular buffer or a ping pong buffer for storing reconstructed pixels of a coding unit including one or more blocks of the video data. For example, the circular buffer 720 can be configured to store reconstructed pixels of a coding unit including the current block 702 as shown in FIG. 7. In some examples, the coding unit can include two or more virtual pipeline data units (VPDUs), such as VPDU0-VPDU3 as shown in the coding unit or CTU 400 of FIG. 4. In some examples, at least one VPDU of the two or more VPDUs can include the current block. For example, the VPDU0 can include the current block 702.

In some examples, the physical memory can include a line buffer for storing reconstructed pixels of one or more blocks of the video data. For example, the physical memory can include a line buffer for storing reconstructed pixels of one or more blocks belonging to a neighboring coding unit of the current CTU including the current block. For example, the physical memory can include a line buffer for storing reconstructed pixels of one or more blocks belonging to the boundary 604a of a top neighboring CTU of the current CTU 610 and/or the boundary 604b of a left neighboring CTU of the current CTU 610. In some examples, the virtual search area 606a can include one or more references to the one or more pixels of the boundary 604a stored in the line buffer, and the virtual search area 606b can include one or more references to the one or more pixels of the boundary 604b stored in the line buffer.

At 806, the process 800 includes extending a search area for performing the intra-block copy prediction for the current block to include the virtual search area. For example, the search area for performing the intra-block copy prediction for the current block 502 in FIG. 5 can be extended to include the one or more virtual search areas 506a-506c. In some examples, the intra-block copy prediction for the current block 502 can be performed using one or more references to one or more pixels in the one or more virtual search areas 506a-506c.

At block 808, the process 800 includes generating an encoded bitstream including at least a portion of the current block. In some examples, information for generating one or more virtual search areas 506a-506c for the current block 502 can also be included in the encoded bitstream. For example, a predefined fixed bit pattern or made up padding values for the virtual search area 506c as discussed above can be signaled from the encoding device to a decoding device in the encoded bitstream. In some examples, the one or more virtual search areas for the current block can be generated by the decoding device using reconstructed pixels of one or more decoded blocks, upon obtaining the current block from the encoded bitstream.

Figure 9:
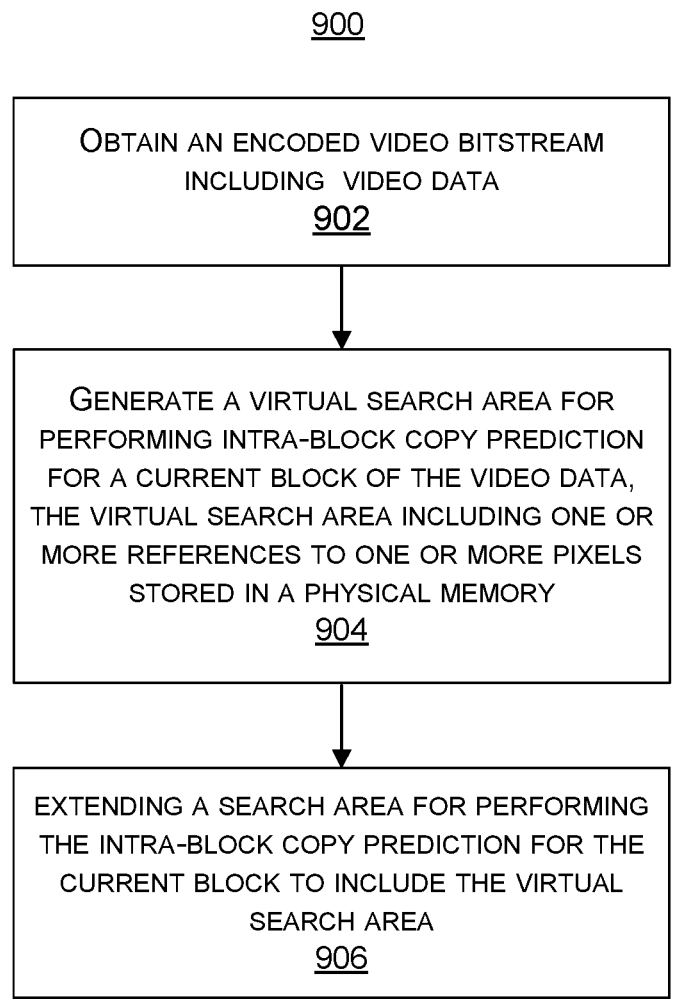
FIG. 9 is a flowchart illustrating an example of a process of decoding video data including performing intra-block copy prediction using a virtual search area, in accordance with some examples.

FIG. 9 is a flowchart illustrating an example of a process 900 of decoding video data by extending a search area for performing intra-block copy (IBC) prediction of a block of video data, using one or more virtual search areas. At 902, the process 900 includes obtaining an encoded video bitstream including the video data. In some examples, the process of obtaining the encoded video bitstream can be performed by a decoding device. The video data can include a plurality of pictures, and the pictures can be divided into a plurality of blocks, as previously described. The video data can also include motion information for the pictures and/or blocks, which can be used to perform motion compensation.

At 904, the process 900 includes generating a virtual search area for performing intra-block copy prediction for a current block of the video data, the virtual search area including one or more references to one or more pixels stored in a physical memory. For example, as shown in FIG. 5, one or more virtual search areas 506a-c can be generated for performing intra-block copy prediction for the current block 502 of the video data. The current block 502 can include a CU or PU and can belong to a current CTU 510. In some examples, the virtual search areas 506a-c can include one or more references to one or more pixels stored in a physical memory.

For example, the one or more pixels stored in the physical memory can include reconstructed pixels belonging to a boundary 504a or a boundary 504b of the current CTU 510 or other coding unit. In some examples, the one or more references to the one or more pixels stored in the physical memory can include repeated references to the reconstructed pixels belonging to the boundary. For example, the virtual search area 506a can include repeated references to the reconstructed pixels belonging to the boundary 504a and the virtual search area 506b can include repeated references to the reconstructed pixels belonging to the boundary 504b of the current CTU 510. In some examples, the repeated references to the reconstructed pixels belonging to the boundary 504a can include a first reference to at least one reconstructed pixel belonging to the boundary 504a and a second reference to the at least one reconstructed pixel belonging to the boundary 504a. Similarly, the repeated references to the reconstructed pixels belonging to the boundary 504b can include a first reference to at least one reconstructed pixel belonging to the boundary 504b and a second reference to the at least one reconstructed pixel belonging to the boundary 504b. In some examples, the one or more references to the one or more pixels can include made up values such as those shown in the virtual search area 606c of FIG. 6.

In some examples, the physical memory can include a circular buffer for storing reconstructed pixels of a coding unit including one or more blocks of the video data. For example, the circular buffer 720 can be configured to store reconstructed pixels of a coding unit including the current block 702 as shown in FIG. 7. In some examples, the coding unit can include two or more virtual pipeline data units (VPDUs), such as VPDU0-VPDU3 as shown in the coding unit or CTU 400 of FIG. 4. In some examples, at least one VPDU of the two or more VPDUs can include the current block. For example, the VPDU0 can include the current block 702. In some examples, at least a portion of the circular buffer can be configured to store reconstructed pixels of the at least one VPDU while intra-block copy prediction is being performed on the one or more blocks of the at least one VPDU. For example, the portion 706 of the circular buffer 720 can be configured to store reconstructed pixels of the VPDU0 while intra-block copy prediction is being performed on the current block 702 of the VPDU0.

In some examples, at least the portion of the circular buffer being used storing reconstructed pixels of the at least one VPDU while intra-block copy prediction is being performed on the one or more blocks of the at least one VPDU is unavailable for storing pixels of the search area for performing the intra-block copy prediction for the current block. For example, portion 706 of the circular butter 720 may be unavailable for storing pixels of the search area within the VPDU0 for performing the intra-block copy prediction for the current block 702. In such examples, the intra-block copy prediction for the current block 702 can be performed by utilizing a virtual search area.

In some examples, the physical memory can include a line buffer for storing reconstructed pixels of one or more blocks of the video data. For example, the physical memory can include a line buffer for storing reconstructed pixels of one or more blocks belonging to a neighboring coding unit of the current CTU including the current block. For example, the physical memory can include a line buffer for storing reconstructed pixels of one or more blocks belonging to the boundary 604a of a top neighboring CTU of the current CTU 610 and/or the boundary 604b of a left neighboring CTU of the current CTU 610. In some examples, the virtual search area 606a can include one or more references to the one or more pixels of the boundary 604a stored in the line buffer, and the virtual search area 606b can include one or more references to the one or more pixels of the boundary 604b stored in the line buffer. In some examples, the one or more references in the one or more virtual search areas to the one or more pixels stored in the physical memory can include repeated references to the reconstructed pixels stored in the line buffer. For example, the repeated references to the reconstructed pixels stored in the line buffer can include a first reference to at least one reconstructed pixel stored in the line buffer and a second reference to the at least one reconstructed pixel stored in the line buffer.

At 906, the process 900 includes extending a search area for performing the intra-block copy prediction for the current block to include the virtual search area. For example, the search area for performing the intra-block copy prediction for the current block 502 in FIG. 5 can be extended to include the one or more virtual search areas 506a-506c. In some examples, the intra-block copy prediction for the current block 502 can be performed using one or more references to one or more pixels in the one or more virtual search areas 506a-506c. For example, as shown and explained with reference to FIG. 2 and FIG. 3, a prediction block can be obtained within the one or more virtual search areas 506a-506c for determining a block vector and generating a prediction signal for performing the intra-block copy of the current block. In some examples, performing the intra-block copy prediction for the current block 502 can include reconstructing the current block 502 based on a prediction value obtained using the intra-block copy prediction and a residual value.

In some implementations, the processes (or methods) described herein, including processes 800 and 900, can be performed by a computing device or an apparatus, such as the system 100 shown in FIG. 1. For example, the processes can be performed by the encoding device 104 shown in FIG. 1 and FIG. 10, by another video source-side device or video transmission device, by the decoding device 112 shown in FIG. 1 and FIG. 11, and/or by another client-side device, such as a player device, a display, or any other client-side device. In some examples, the computing device or apparatus may include a camera configured to capture video data (e.g., a video sequence) including video frames. In some examples, a camera or other capture device that captures the video data is separate from the computing device, in which case the computing device receives or obtains the captured video data.

In some cases, the computing device or apparatus may include one or more input devices, one or more output devices, one or more processors, one or more microprocessors, one or more microcomputers, and/or other component(s) that is/are configured to carry out the steps of the processes described herein. In some examples, the computing device may include a mobile device, a desktop computer, a server computer and/or server system, or other type of computing device. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The components of the computing device (e.g., the one or more input devices, one or more output devices, one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 800 and 900 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein, including processes 800 and 900, may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 10:
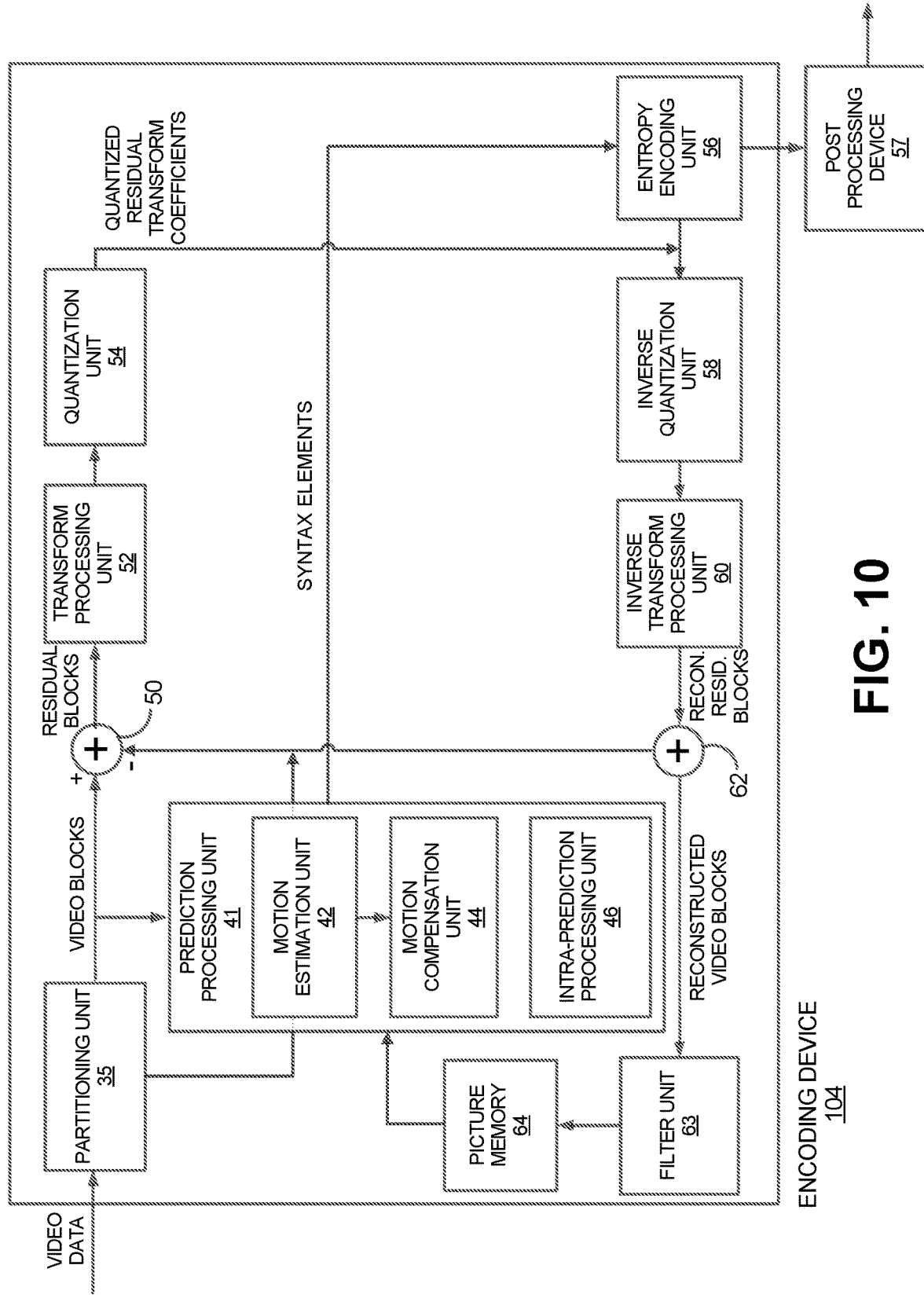
FIG. 10 is a block diagram illustrating an example video encoding device, in accordance with some embodiments.
Figure 11:
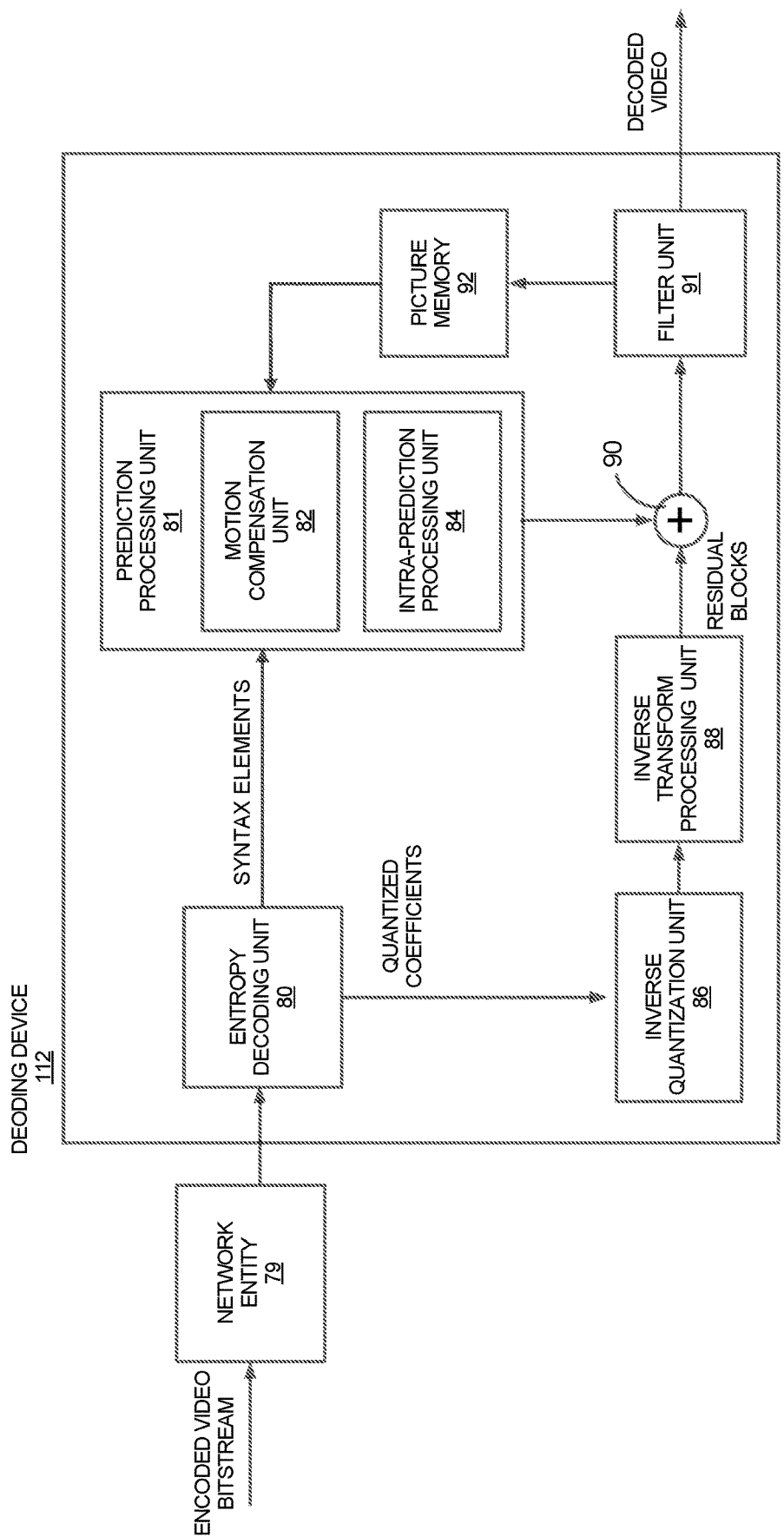
FIG. 11 is a block diagram illustrating an example video decoding device, in accordance with some embodiments.

Specific details of the encoding device 104 and the decoding device 112 are shown in FIG. 10 and FIG. 11, respectively. FIG. 10 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 10 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 10, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 10 represents an example of a video encoder configured to perform any of the techniques described herein, including the processes described above with respect to FIG. 8 and/or FIG. 9. In some cases, some of the techniques of this disclosure may also be implemented by post processing device 57.

FIG. 11 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 11.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 11 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 11 represents an example of a video decoder configured to perform any of the techniques described herein, including the processes described above with respect to FIG. 8 and/or FIG. 9.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Example 1

A method of decoding video data. The method includes: obtaining an encoded video bitstream including video data; generating a virtual search area for performing intra-block copy prediction for a current block of the video data, the virtual search area including one or more references to one or more pixels stored in a physical memory; and extending a search area for performing the intra-block copy prediction for the current block to include the virtual search area.

Example 2

A method according to Example 1, wherein the physical memory comprises a circular buffer for storing reconstructed pixels of a coding unit comprising one or more blocks of the video data.

Example 3

A method according to any of Examples 1 or 2, wherein the one or more pixels stored in the physical memory comprise reconstructed pixels belonging to a boundary of the coding unit.

Example 4

A method according to any of Examples 1 to 3, wherein the one or more references to the one or more pixels stored in the physical memory comprise repeated references to the reconstructed pixels belonging to the boundary.

Example 5

A method according to any of Examples 1 to 4, wherein the repeated references to the reconstructed pixels belonging to the boundary comprise a first reference to at least one reconstructed pixel belonging to the boundary and a second reference to the at least one reconstructed pixel belonging to the boundary.

Example 6

A method according to any of Examples 1 to 5, wherein the current block belongs to the coding unit.

Example 7

A method according to any of Examples 1 to 6, wherein the coding unit includes two or more virtual pipeline data units (VPDUs), at least one VPDU of the two or more VPDUs comprising the current block, and wherein at least a portion of the circular buffer is configured to store reconstructed pixels of the at least one VPDU while intra-block copy prediction is being performed on the one or more blocks of the at least one VPDU.

Example 8

A method according to any of Examples 1 to 7, wherein at least the portion of the circular buffer is unavailable for storing pixels of the search area for performing the intra-block copy prediction for the current block.

Example 9

A method according to any of Examples 1 to 8, wherein the physical memory comprises a line buffer for storing reconstructed pixels of one or more blocks of the video data.

Example 10

A method according to any of Examples 1 to 9, wherein the one or more blocks belong to a neighboring coding unit of a current coding unit comprising the current block.

Example 11

A method according to any of Examples 1 to 10, wherein the one or more references to the one or more pixels stored in the physical memory comprise repeated references to the reconstructed pixels stored in the line buffer.

Example 12

A method according to any of Examples 1 to 11, wherein the repeated references to the reconstructed pixels stored in the line buffer comprise a first reference to at least one reconstructed pixel stored in the line buffer and a second reference to the at least one reconstructed pixel stored in the line buffer.

Example 13

A method according to any of Examples 1 to 12, further comprising: performing the intra-block copy prediction for the current block using one or more references to one or more pixels in the virtual search area.

Example 14

A method according to any of Examples 1 to 13, further comprising: reconstructing the current block based on a prediction value obtained using the intra-block copy prediction and a residual value.

Example 15

An apparatus for decoding video data, the apparatus comprising: a memory; and a processor implemented in circuitry and configured to: obtain an encoded video bitstream including video data; generate a virtual search area for performing intra-block copy prediction for a current block of the video data, the virtual search area including one or more references to one or more pixels stored in a physical memory; and extend a search area for performing the intra-block copy prediction for the current block to include the virtual search area.

Example 16

An apparatus according to Example 15, wherein the physical memory comprises a circular buffer for storing reconstructed pixels of a coding unit comprising one or more blocks of the video data.

Example 17

An apparatus according to any of Examples 15 to 16, wherein the one or more pixels stored in the physical memory comprise reconstructed pixels belonging to a boundary of the coding unit.

Example 18

An apparatus according to any of Examples 15 to 17, wherein the one or more references to the one or more pixels stored in the physical memory comprise repeated references to the reconstructed pixels belonging to the boundary.

Example 19

An apparatus according to any of Examples 15 to 18, wherein the repeated references to the reconstructed pixels belonging to the boundary comprise a first reference to at least one reconstructed pixel belonging to the boundary and a second reference to the at least one reconstructed pixel belonging to the boundary.

Example 20

An apparatus according to any of Examples 15 to 19, wherein the current block belongs to the coding unit.

Example 21

An apparatus according to any of Examples 15 to 20, wherein the coding unit includes two or more virtual pipeline data units (VPDUs), at least one VPDU of the two or more VPDUs comprising the current block, and wherein at least a portion of the circular buffer is configured to store reconstructed pixels of the at least one VPDU while intra-block copy prediction is being performed on the one or more blocks of the at least one VPDU.

Example 22

An apparatus according to any of Examples 15 to 21, wherein at least the portion of the circular buffer is unavailable for storing pixels of the search area for performing the intra-block copy prediction for the current block.

Example 23

An apparatus according to any of Examples 15 to 22, wherein the physical memory comprises a line buffer for storing reconstructed pixels of one or more blocks of the video data.

Example 24

An apparatus according to any of Examples 15 to 23, wherein the one or more blocks belong to a neighboring coding unit of a current coding unit comprising the current block.

Example 25

An apparatus according to any of Examples 15 to 24, wherein the one or more references to the one or more pixels stored in the physical memory comprise repeated references to the reconstructed pixels stored in the line buffer.

Example 26

An apparatus according to any of Examples 15 to 25, wherein the processor is further configured to: perform the intra-block copy prediction for the current block using one or more references to one or more pixels in the virtual search area.

Example 27

An apparatus according to any of Examples 15 to 26, wherein the apparatus comprises a mobile device with a camera for capturing the one or more pictures.

Example 28

An apparatus according to any of Examples 15 to 27, further comprising a display for displaying the one or more pictures.

Example 29

A non-transitory computer-readable medium having stored thereon instructions that when executed by a processor perform the methods of any of examples 1 to 14. For example, the non-transitory computer-readable medium can have stored thereon instructions that, when executed by one or more processors, cause the one or more processors to: obtain an encoded video bitstream including video data; generate a virtual search area for performing intra-block copy prediction for a current block of the video data, the virtual search area including one or more references to one or more pixels stored in a physical memory; and extend a search area for performing the intra-block copy prediction for the current block to include the virtual search area.

Example 30

An apparatus for decoding video data according to any of the examples 1 to 14. The apparatus includes: means for obtaining an encoded video bitstream including video data; means for generating a virtual search area for performing intra-block copy prediction for a current block of the video data, the virtual search area including one or more references to one or more pixels stored in a physical memory; and means for extending a search area for performing the intra-block copy prediction for the current block to include the virtual search area.

Example 31

A method for encoding video data. The method includes: obtaining a current block of a picture of video data; generating a virtual search area for performing intra-block copy prediction for the current block, the virtual search area including one or more references to one or more pixels stored in a physical memory; extending a search area for performing the intra-block copy prediction for the current block to include the virtual search area; and generating an encoded video bitstream including at least a portion of the current block.

Example 32

A method according to Example 31, wherein the physical memory comprises a circular buffer for storing reconstructed pixels of a coding unit comprising one or more blocks of the video data.

Example 33

A method according to any of Examples 31 or 32, wherein the one or more pixels stored in the physical memory comprise reconstructed pixels belonging to a boundary of the coding unit.

Example 34

A method according to any of Examples 31 to 33, wherein the one or more references to the one or more pixels stored in the physical memory comprise repeated references to the reconstructed pixels belonging to the boundary.

Example 35

A method according to any of Examples 31 to 34, wherein the repeated references to the reconstructed pixels belonging to the boundary comprise a first reference to at least one reconstructed pixel belonging to the boundary and a second reference to the at least one reconstructed pixel belonging to the boundary.

Example 36

A method according to any of Examples 31 to 35, wherein the current block belongs to the coding unit.

Example 37

A method according to any of Examples 31 to 36, wherein the coding unit includes two or more virtual pipeline data units (VPDUs), at least one VPDU of the two or more VPDUs comprising the current block, and wherein at least a portion of the circular buffer is configured to store reconstructed pixels of the at least one VPDU while intra-block copy prediction is being performed on the one or more blocks of the at least one VPDU.

Example 38

A method according to any of Examples 31 to 37, wherein at least the portion of the circular buffer is unavailable for storing pixels of the search area for performing the intra-block copy prediction for the current block.

Example 39

A method according to any of Examples 31 to 38, wherein the physical memory comprises a line buffer for storing reconstructed pixels of one or more blocks of the video data.

Example 40

A method according to any of Examples 31 to 39, wherein the one or more blocks belong to a neighboring coding unit of a current coding unit comprising the current block.

Example 41

A method according to any of Examples 31 to 40, wherein the one or more references to the one or more pixels stored in the physical memory comprise repeated references to the reconstructed pixels stored in the line buffer.

Example 42

A method according to any of Examples 31 to 41, wherein the repeated references to the reconstructed pixels stored in the line buffer comprise a first reference to at least one reconstructed pixel stored in the line buffer and a second reference to the at least one reconstructed pixel stored in the line buffer.

Example 43

A method according to any of Examples 31 to 42, further comprising: performing the intra-block copy prediction for the current block using one or more references to one or more pixels in the virtual search area.

Example 44

A method according to any of Examples 31 to 43, further comprising: reconstructing the current block based on a prediction value obtained using the intra-block copy prediction and a residual value.

Example 45

An apparatus for encoding video data according to any of the methods 31 to 44. The apparatus comprises a memory and a processor implemented in circuitry and configured to: obtain a current block of a picture of video data; generate a virtual search area for performing intra-block copy prediction for the current block, the virtual search area including one or more references to one or more pixels stored in a physical memory; extend a search area for performing the intra-block copy prediction for the current block to include the virtual search area; and generate an encoded video bitstream including at least a portion of the current block.

Example 46

A non-transitory computer-readable medium having stored thereon instructions that, when executed by one or more processors, cause the one or more processors to perform the methods of any of examples 31 to 44. For example, the non-transitory computer-readable medium can have stored thereon instructions that, when executed by one or more processors, cause the one or more processors to: obtain a current block of a picture of video data; generate a virtual search area for performing intra-block copy prediction for the current block, the virtual search area including one or more references to one or more pixels stored in a physical memory; extend a search area for performing the intra-block copy prediction for the current block to include the virtual search area: and generate an encoded video bitstream including at least a portion of the current block.

Example 47

An apparatus for decoding video data according to any of the examples 31 to 44. The apparatus includes: means for obtaining a current block of a picture of video data; means for generating a virtual search area for performing intra-block copy prediction for the current block, the virtual search area including one or more references to one or more pixels stored in a physical memory; means for extending a search area for performing the intra-block copy prediction for the current block to include the virtual search area; and means for generating an encoded video bitstream including at least a portion of the current block.

Example 48

A method of processing video data. The method includes: obtaining video data; determining intra-block copy prediction is enabled for performing intra-picture prediction on at least one block of the video data; and generating an extended search reference area for the intra-block copy prediction for the at least one block, the extended search reference area being generated by adding padding pixels at a search range boundary associated with the intra-block copy prediction.

Example 49

A method according to Example 48, wherein the padding pixels include repeating boundary pixels from a boundary of a current reference area.

Example 50

A method according to any of Examples 48 to 49, wherein the padding pixels include repeating boundary pixels of one or more neighboring blocks.

Example 51

A method according to any of Examples 48 to 50, wherein the boundary pixels of the one or more neighboring blocks are obtained from a line buffer.

Example 52

A method according to any of Examples 48 to 51, wherein the extended search reference area is stored using a circular buffer.

Example 53

A method according to any of Examples 33 to 52, wherein a storage region of the circular buffer including reconstructed pixels of a neighboring coding unit is updated using reconstructed pixels of a current coding unit, the current coding unit including the at least one block.

Example 54

A method according to any of Examples 48 to 53, wherein the storage region being updated is not a search reference area.

Example 55

A method according to any of Examples 48 to 54, wherein the storage region is replaced by one or more padding pixels from the extended search reference area.

Example 56

A method according to any of Examples 48 to 55, further comprising signaling an indication of the extended search reference area in an encoded video bitstream.

Example 57

A method according to any of Examples 48 to 56, further comprising: performing the intra-block copy prediction for the at least one block using the extended search reference area.

Example 58

An apparatus comprising a memory configured to store video data and a processor configured to process the video data according to any of the Examples 48 to 57.

Example 59

An apparatus according to Example 58, wherein the apparatus includes a decoder.

Example 60

An apparatus according to Example 58, wherein the apparatus includes an encoder.

Example 61

An apparatus according to any of Examples 58 to 60, wherein the apparatus is a mobile device.

Example 62

An apparatus according to any of Examples 58 to 61, wherein the apparatus includes a display configured to display the video data.

Example 63

An apparatus according to any of Examples 58 to 62, wherein the apparatus includes a camera configured to capture one or more pictures.

Example 64

A computer readable medium having stored thereon instructions that when executed by a processor perform the methods of any of claims 48 to 57.

What is claimed is:

1. A method of decoding video data, the method comprising:
   obtaining an encoded video bitstream including video data;
   generating a virtual search area for performing intra-block copy prediction for a current block of the video data, the virtual search area including one or more references to one or more pixels stored in a physical memory; and
   extending a search area for performing the intra-block copy prediction for the current block to include the virtual search area.

2. The method of claim 1, wherein the physical memory comprises a circular buffer for storing reconstructed pixels of a coding unit comprising one or more blocks of the video data.

3. The method of claim 2, wherein the one or more pixels stored in the physical memory comprise reconstructed pixels belonging to a boundary of the coding unit.

4. The method of claim 3, wherein the one or more references to the one or more pixels stored in the physical memory comprise repeated references to the reconstructed pixels belonging to the boundary.

5. The method of claim 4, wherein the repeated references to the reconstructed pixels belonging to the boundary comprise a first reference to at least one reconstructed pixel belonging to the boundary and a second reference to the at least one reconstructed pixel belonging to the boundary.

6. The method of claim 2, wherein the current block belongs to the coding unit.

7. The method of claim 2, wherein the coding unit includes two or more virtual pipeline data units (VPDUs), at least one VPDU of the two or more VPDUs comprising the current block, and wherein at least a portion of the circular buffer is configured to store reconstructed pixels of the at least one VPDU while intra-block copy prediction is being performed on the one or more blocks of the at least one VPDU.

8. The method of claim 7, wherein at least the portion of the circular buffer is unavailable for storing pixels of the search area for performing the intra-block copy prediction for the current block.

9. The method of claim 1, wherein the physical memory comprises a line buffer for storing reconstructed pixels of one or more blocks of the video data.

10. The method of claim 9, wherein the one or more blocks belong to a neighboring coding unit of a current coding unit comprising the current block.

11. The method of claim 9, wherein the one or more references to the one or more pixels stored in the physical memory comprise repeated references to the reconstructed pixels stored in the line buffer.

12. The method of claim 11, wherein the repeated references to the reconstructed pixels stored in the line buffer comprise a first reference to at least one reconstructed pixel stored in the line buffer and a second reference to the at least one reconstructed pixel stored in the line buffer.

13. The method of claim 1, further comprising:
   performing the intra-block copy prediction for the current block using one or more references to one or more pixels in the virtual search area.

14. The method of claim 1, further comprising:
   reconstructing the current block based on a prediction value obtained using the intra-block copy prediction and a residual value.

15. An apparatus for decoding video data, the apparatus comprising:
   a memory; and
   a processor implemented in circuitry and configured to:
      obtain an encoded video bitstream including video data;
      generate a virtual search area for performing intra-block copy prediction for a current block of the video data, the virtual search area including one or more references to one or more pixels stored in a physical memory; and
      extend a search area for performing the intra-block copy prediction for the current block to include the virtual search area.

16. The apparatus of claim 15, wherein the physical memory comprises a circular buffer for storing reconstructed pixels of a coding unit comprising one or more blocks of the video data.

17. The apparatus of claim 16, wherein the one or more pixels stored in the physical memory comprise reconstructed pixels belonging to a boundary of the coding unit.

18. The apparatus of claim 17, wherein the one or more references to the one or more pixels stored in the physical memory comprise repeated references to the reconstructed pixels belonging to the boundary.

19. The apparatus of claim 18, wherein the repeated references to the reconstructed pixels belonging to the boundary comprise a first reference to at least one reconstructed pixel belonging to the boundary and a second reference to the at least one reconstructed pixel belonging to the boundary.

20. The apparatus of claim 16, wherein the current block belongs to the coding unit.

21. The apparatus of claim 16, wherein the coding unit includes two or more virtual pipeline data units (VPDUs), at least one VPDU of the two or more VPDUs comprising the current block, and wherein at least a portion of the circular buffer is configured to store reconstructed pixels of the at least one VPDU while intra-block copy prediction is being performed on the one or more blocks of the at least one VPDU.

22. The apparatus of claim 21, wherein at least the portion of the circular buffer is unavailable for storing pixels of the search area for performing the intra-block copy prediction for the current block.

23. The apparatus of claim 15, wherein the physical memory comprises a line buffer for storing reconstructed pixels of one or more blocks of the video data.

24. The apparatus of claim 23, wherein the one or more blocks belong to a neighboring coding unit of a current coding unit comprising the current block.

25. The apparatus of claim 23, wherein the one or more references to the one or more pixels stored in the physical memory comprise repeated references to the reconstructed pixels stored in the line buffer.

26. The apparatus of claim 15, wherein the processor is further configured to:
    perform the intra-block copy prediction for the current block using one or more references to one or more pixels in the virtual search area.

27. The apparatus of claim 15, wherein the apparatus comprises a mobile device with a camera for capturing one or more pictures.

28. The apparatus of claim 15, further comprising a display for displaying one or more pictures.

29. A non-transitory computer-readable medium having stored thereon instructions that, when executed by one or more processors, cause the one or more processors to:
    obtain an encoded video bitstream including video data;
    generate a virtual search area for performing intra-block copy prediction for a current block of the video data, the virtual search area including one or more references to one or more pixels stored in a physical memory; and
    extend a search area for performing the intra-block copy prediction for the current block to include the virtual search area.

30. An apparatus for encoding video data, the apparatus comprising:
    a memory; and
    a processor implemented in circuitry and configured to:
        obtain a current block of a picture of video data;
        generate a virtual search area for performing intra-block copy prediction for the current block, the virtual search area including one or more references to one or more pixels stored in a physical memory;
        extend a search area for performing the intra-block copy prediction for the current block to include the virtual search area; and
        generate an encoded video bitstream including at least a portion of the current block.

* * * * *